(12) United States Patent
Long

(10) Patent No.: US 12,458,579 B2
(45) Date of Patent: Nov. 4, 2025

(54) CANNABIS-BASED PRODUCTS AND METHODS

(71) Applicant: Lawrence Lanier Long, New York City, NY (US)

(72) Inventor: Lawrence Lanier Long, New York City, NY (US)

(*) Notice: Subject to any disclaimer, the term of this patent is extended or adjusted under 35 U.S.C. 154(b) by 381 days.

(21) Appl. No.: 18/114,914

(22) Filed: Feb. 27, 2023

(65) Prior Publication Data

US 2023/0270650 A1    Aug. 31, 2023

Related U.S. Application Data

(60) Provisional application No. 63/313,847, filed on Feb. 25, 2022.

(51) Int. Cl.

| | | |
|---|---|---|
| *A61K 36/00* | (2006.01) | |
| *A61K 8/06* | (2006.01) | |
| *A61K 8/34* | (2006.01) | |
| *A61K 8/49* | (2006.01) | |
| *A61K 8/67* | (2006.01) | |
| *A61K 8/92* | (2006.01) | |
| *A61K 8/9794* | (2017.01) | |
| *A61Q 19/00* | (2006.01) | |
| *A61Q 19/10* | (2006.01) | |

(52) U.S. Cl.
CPC .............. *A61K 8/498* (2013.01); *A61K 8/062* (2013.01); *A61K 8/347* (2013.01); *A61K 8/678* (2013.01); *A61K 8/922* (2013.01); *A61K 8/9794* (2017.08); *A61Q 19/007* (2013.01); *A61Q 19/10* (2013.01)

(58) Field of Classification Search
CPC ..................................................... A61K 8/062
See application file for complete search history.

(56) References Cited

U.S. PATENT DOCUMENTS

| | | |
|---|---|---|
| 7,887,857 B1 | 2/2011 | Johnson |
| 8,425,954 B2 | 4/2013 | Stone |
| 9,078,838 B2 | 7/2015 | Andre et al. |
| 10,188,628 B1 | 1/2019 | Kershman et al. |
| 10,517,821 B1 | 12/2019 | Fuladi |
| 10,596,148 B2 | 3/2020 | Merary et al. |
| 10,617,128 B2 | 4/2020 | Windrix |
| 10,668,045 B2 | 6/2020 | Hari et al. |
| 10,940,173 B2 | 3/2021 | Finley et al. |
| 10,981,856 B1 | 4/2021 | Nordahl |
| 11,040,017 B2 | 6/2021 | Merritt |
| 11,058,651 B2 | 7/2021 | Fuladi |
| 11,083,768 B2 | 8/2021 | Malasquez |
| 11,098,023 B2 | 8/2021 | Carnahan |
| 11,135,258 B2 | 10/2021 | Rivas |
| 11,197,833 B2 | 12/2021 | Hari |
| 11,220,653 B2 | 1/2022 | Yao |
| 2020/0138736 A1 | 5/2020 | Merritt |
| 2020/0155479 A1 | 5/2020 | Hackney |
| 2022/0062221 A1 | 3/2022 | Hanlon |
| 2022/0401381 A1 | 12/2022 | Padma-Nathan et al. |
| 2023/0058750 A1 | 2/2023 | Braxton |

OTHER PUBLICATIONS

Dominique Fontaine, "2022's 8 Best CBD Lotions, Creams, Salves, and More", https://www.healthline.com/health/top-10-cbd-lotions-creams and-topicals, updated Dec. 5, 2022.
Dominique Fontaine, "9 of the best CBD lotions and creams", https://www.medicalnewstoday.com/articles/cbd-skin-cream#summary, updated Sep. 28, 2022.
Lauren Silva and Meaghan Harmon, "Best CBD Creams Of 2023", https://www.forbes.com/health/body/best-cbd-creams/, Jan. 31, 2023.

*Primary Examiner* — Qiuwen Mi
(74) *Attorney, Agent, or Firm* — Eric D. Jorgenson; E.D. Jorgenson Law, LLC

(57) ABSTRACT

Products and methods for *cannabis*-based and *cannabis*-free lotions, incense, soaps, oils, teas, exfoliators, candles, and bath products, some or all of which can comprise *cannabis* (and/or *cannabis* extractions such as oils) and THC extracts.

8 Claims, 24 Drawing Sheets

Incense stick – e.g. Palo Santo

Gelatin Soap Bar

Light-Colored Soap Bar w/Mosses

Gelatin Soap Wheel

White Soap Wheel

Staged Collection of Products

Staged Collection of Products

Staged Collection of Products

CANNABIS-BASED PRODUCTS AND METHODS

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed innovative products and methods comprise numerous embodiments of lotions, soaps, salves, oils, teas, exfoliators, candles, and incense, some or all of which can comprise *cannabis* (and/or *cannabis* extractions such as oils). As described herein, the term "marijuana" synonymous with the term "*cannabis*", each of which refers to parts of or products from the plant genus *cannabis*. Each *cannabis* species contains THC (tetrahydrocannabinol), the psychoactive component of *cannabis* plants and CBD (cannabidiol), the non-impairing or non-psychoactive component of the *cannabis* plants.

The use of CBD oil as described herein is understood to be derived from *cannabis*; however, where indicated, CBD from hemp or other sources can be designated. However, it is to be understood that this description can apply to *cannabis indica*, and any hybrids of *sativa* and *indica*, as well as other species (or strains) not mentioned herein but present in the industry. The growing, use (recreational and medicinal), and processing of marijuana (*cannabis*) and its constituent elements (e.g., plant parts, fluids, oils, etc.) as described herein are intended to follow state and federal regulations for such plants and plant byproducts.

Disclosed herein are at least four types of incense (and associated elements): a dab oil concentrate, a stick incense with powdered marijuana, cone incense with powdered marijuana, and, a smudge incense for short burns and then can be reused for subsequent burns until completely consumed.

Generally, the first type of incense is regular incense with dab oil concentrate. This is a predetermined amount (e.g., a pound) of marijuana from which is processed a small number of drops of "dab" oil, and which oil can include a significant potency (e.g., greater than or equal to 50%) of THC. "Dabbing" is a process of heating a concentrate or extract to the point it vaporizes, for inhalation, for example.

The second type of incense is a standard stick incense; however, the body of the incense is made from powdered marijuana with added spices and burning agents such as makko powder (generally, a form of "incense powder", but which powder can be used as a base binder for binding recipes of incense for various desired shapes and forms (e.g., on sticks and into cones)). Thus, handmade incense formats (e.g., stick, cones, etc.) can use makko to enhance the construction technique of rolling onto the stick, for example, by hand, which can be a difficult process.

The third type is a similar formula as the second type, but formed into a smaller cone shaped incense, which burns on its own without a central stick.

The fourth type is marijuana leaves and/or buds (also, blossoms) folded into a smudge stick, similar to a sage smudge. This smudge can contain several incarnations, as this smudge can contain herbs (*cannabis*, and/or non-*cannabis*), spices, the leaves of marijuana, and buds typically smoked in marijuana cigarettes (also referred to as "joints"). This fourth type is intended to be burned for a short time (e.g., few minutes), then extinguished, and where possible, reused at a later time until burned completely.

When marijuana is added to a lotion, topically, there are no medical issues (also referred to as an "interference") when the user is taking one or more medications. While most lotions can soothe and moisturize, the marijuana lotion gently and effectively repairs the superficial layers of the skin.

In one product implementation, the lotion contains 4% THC provided by dab marijuana concentration, 1% THC extract, 5% terpenes, and 3% CBD, which is below the legal limit. The healing can be more effective because of any one or more of other herbs and botanicals such as soothing Aloe Vera, vitamin E, five essential oils, chamomile and burdock root extracts, grape seed oil, and olive oil. (The THC levels can be maintained within the Federal Guidelines of the Regulatory Limits.)

The effects of CBD alone are notable; however, the introduction of THC with CBD at predetermined amounts, activates the CBD to an increased level of usefulness. Thus, increasing amounts of THC with CBD makes CBD a correspondingly more effective product. The ingredients of CBD and THC work hand-in-hand, topically, on the superficial layers of the skin. This product is intended to soothe and comfort minor aches and pains for an analgesic effect.

With respect to soaps, when sea moss is ingested, it has a host of immune supporting antioxidant compounds that only the sea can contribute. When used with the help of other botanicals, the spirit-lifting effects can enhance the cleansing effects of sea water. For example, when sea moss is mixed with Lavender or Lemongrass the effects will be calming or relaxing. When Irish moss is combined with Sandalwood or *Eucalyptus*, for example, the soap includes stimulating affects.

This soap can also be produced with the healing properties of Epsom Salt and Himalayan Sea Salt (which both have magnesium) which imparts a grounding and centering effect to the user. When, alternatively or additionally, blending in sandalwood and/or *eucalyptus*, the soap will also have stimulating effects. These specimens smell heavenly and are so appealing to the eye that consumers may hesitate to use them, and instead, use them as bathroom and shower decorations.

However, the medicinal, nutritional, and healing benefits of these soaps are appealing. Consider a bar of soap with the sea moss protruding or breaking the surface of the soap product, ready for a mild exfoliation of dead superficial layers of skin, and thereby ready for polishing. A more transparent or clear soap bar, which can contain grassy swirls of the sea moss which are partly or entirely visible, and enhanced by other botanicals resembling jewels encased in an underwater sea world, present an appealing enticement to the consumer not only simply for presentation, but also of application.

An exfoliation bar soap with *cannabis* is disclosed. This soap product, along with cleansing the superficial layer of skin and when the real marijuana is used, exfoliates the superficial layers of skin and have calming effects. When marijuana is used with the help of other botanicals the spirit lifting effects can enhance the cleansing effects of the user. For example, when *Indica* is mixed with Lavender or Lemongrass the effects will be calming or relaxing. Or when *Sativa* is combined with Sandalwood or *Eucalyptus* the soap will have stimulating effects. The soap also includes, when mixed with marijuana, the healing properties of Epsom Salt and Himalayan Sea Salt which has magnesium and is grounding and centering. The aroma and presentation aspects of this soap alone, provide an enticement to purchase this product. For example, a flower-shaped soap with marijuana petals or white goat milk with floating marijuana and botanicals present an appeal for purchasing the soap product.

With respect to teas, the disclosed combination of teas is intended to heal and build a strong immunity and to heighten a peaceful sensation. The herbal tea experience can be enhanced with real marijuana buds. This tea can be provided in different flavors (e.g., three) and moods. The first mood produced is a Relax flavor in which the *Indica* marijuana strain soothes and calms with herbs and botanicals such as Chamomile, Lemongrass, and Passion Flowers. The second mood produced is the Lift flavor for stimulation. This tea can be fused with *cannabis* herbs such as the *Sativa* marijuana strain, which is intended to activate and stimulate the senses with added non-*cannabis* herbs such as Hibiscus, Ginger, and Cinnamon. The third mood of the herbal tea flavor produced is the Cleanse effect. This purification tea is provided by using the combination of *Sativa* and *Indica* strains of marijuana, along with the non-*cannabis* herbs of Rosemary, Lemon, and Sage. (All teas using THC used can be produced within the Federal Guidelines Regulatory limit of THC.)

With respect to bath salts and bath bombs, botanicals are meant to decompress the nervous system using nature's own terpenoids to calm and soothe the user. Marijuana infused in a decarboxylator (a machine that performs decarboxylation) activates terpenes when used in a bath, releasing the aroma of the *cannabis* herb. (Decarboxylation is the process of activating the effects of a specific component. For example, decarboxylation is the process of heating *cannabis* to a specific temperature and for a specific length of time, which process activates the psychoactive effects of the THC as well as activating other cannabinoids inside.) Thus, decarboxylating marijuana produces the noticeable effects of *cannabis* for medical and recreational users.

The marijuana not infused still has calming effects, just as the visual effects of rose petals, chamomile flowers and lavender would. Added are Aloe Vera and vitamin E to moisturize the skin of the user within the bath water. The loose Epsom salts and Dead Sea salts that come in the decorative jar add needed magnesium for a healthy glow effect.

This combination of botanicals is just as effective in the prepared Bath Bombs. A bath bomb releases all its ingredients in a fizzy, aromatic discharge technique ("bomb"), just perfect for the impact of marijuana buds. The effervescence of the bath bomb brings the aromatherapeutic experience, and medicinal experiences pleasantly together. The minerals and the marijuana gently and effectively remove the toxic nature of the free radicals.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
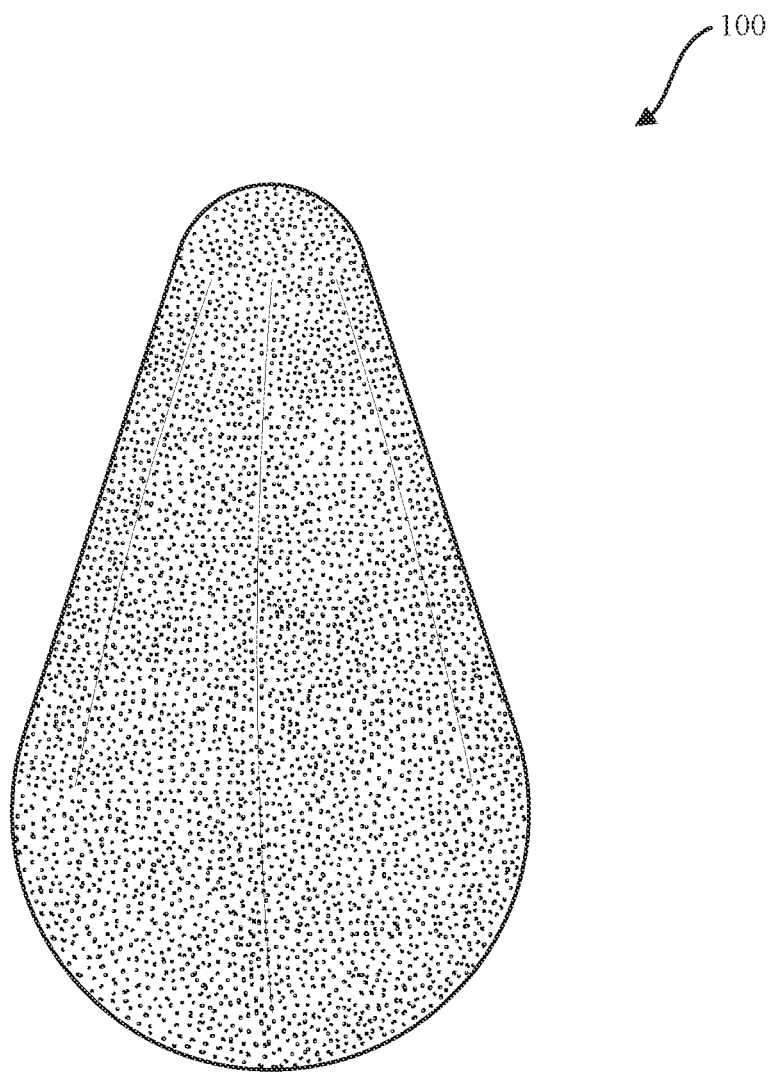
FIG. 1 illustrates an incense cone created and fashioned in accordance with a disclosed process.

The disclosed innovative products, processes, and methods comprise numerous embodiments such as lotions, soaps, oils, teas, exfoliators, candles, and incense, some or all of which can comprise *cannabis* (and/or *cannabis* extractions such as oils). As described herein, the term "marijuana" synonymous with the term "*cannabis*", each of which refers to parts of or products from the plant genus *cannabis*. Each *cannabis* species contains THC (tetrahydrocannabinol), the psychoactive component of *cannabis* plants and CBD (cannabidiol), the non-impairing or non-psychoactive component of the *cannabis* plants. However, it is to be understood that this description can apply to *cannabis indica*, and any hybrids of *sativa* and *indica*, as well as other species (or strains) not mentioned herein but present in the industry.

As defined herein, a *cannabis* concentrate is the resulting product from distilling down parts of the *cannabis* plant. The concentrate includes the terpenes of the *cannabis* flowers, all of the cannabinoids, but none of the excess plant material. The cannabinoids and terpenes are found in/on the plant as trichomes that provide the effects, aroma(s) and flavors experienced. Thus, the *cannabis* concentrate is a condensed accumulation of the trichomes which can be consumed and/or applied topically. Extracts are a specific type of concentrate, and can be made using a solvent or solvent-free. Solvents include, but are not limited to, alcohol, butane, and CO2, for example.

The terms "about" and "around," as used herein to modify a numerical value, indicate a close range surrounding that explicit value. If "X" were the value, "about X" or "around X" indicates a value from 0.8X to 1.2X, preferably a value from 0.9X to 1.1X, and, more preferably, a value from 0.95X to 1.05X. Any reference to "about X" or "around X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and provide written description support for a claim limitation of, e.g., "0.98X."

In some instances, matter, such as the amount of an oil, can be expressed as "w/w", which means weight per weight (or mass per mass). That is, the matter considered is a ratio of the mass of a constituent to the mass of the whole. For example, if the total mass of the solution is 200 grams, and the solution has constituent solutions of forty (40) grams of Solution A and 160 grams of Solution B, it can be said that Solution A is 20% w/w and Solution B is 80% w/w.

Cannabinoids are a group of substances found in several species of *cannabis* plants. For example, the *Cannabis sativa* plant, where THC and CBD (cannabidiol—the non-impairing or non-euphoric component of the *cannabis* plants) are the primary cannabinoids of more than one-hundred (100) other cannabinoids identified. The amount (or percentage) of THC, and the amount (or percentage) of CBD varies on a plant-by-plant basis and species basis as determined by laboratory tests on each strain.

The *cannabis* plant may contain other less common compounds such as: CBN (cannabinol), a non-impairing or non-euphoric compound which may ease side effects and symptoms neurological conditions; THCA (tetrahydrocannabinol acid), which does not cause any psychoactive effects and may benefit reduced inflammations and reduced symptoms of neurological conditions; and, CBG (cannabigerol), thought to reduce anxiety and OCD (obsessive-compulsive disorder) symptoms, depression, and PTSD (post-traumatic stress disorder).

The *cannabis* plant contains over five-hundred forty (540) chemical substances, of which THC is the substance that is primarily responsible for the effects of marijuana on a person's mental state (the "*cannabis* high"). *Cannabis* plants that contain "very little THC", under U.S. law, are considered "industrial hemp", rather than marijuana. (Obtained from the NIH (National Institute of Health) website (*Cannabis* (Marijuana) and Cannabinoids: What You Need To Know|NCCIH (nih.gov).)

The genus "*cannabis*", as used herein, refers to all derivations (also, strains or species) from the plant *Cannabis sativa* (also referred to as *sativa*-dominant strains), the plant *cannabis indica* (also referred to as *indica*-dominant strains), and hybrids thereof. The strains of *cannabis* being grown can be categorized according to three types: *sativa*, *indica*, and hybrid. However, as new species are created, other categories can be included (e.g., *Cannabis ruderalis*-a type of *cannabis* that typically does not produce any noticeable potent effects).

Some parts of the *cannabis* industry have moved away from the primary species/category names of *sativa*, *indica*, and hybrid to a "chemovar" (chemical variety) classification. The chemovar of a *cannabis* plant can be Type I: high THC, Type II: THC and CBD combined, and Type III: high CBD.

CBD can be applied topically to parts of the consumer's body (e.g., skin, muscled areas, etc.), and/or taken by the consumer orally (e.g., by mouth, nasal passages, etc.), depending on the effects desired.

The *sativa*-dominant strains are typically associated with a cerebral high or "head high" (where the cerebral high includes effects related to, e.g., increased energy, a boost in creativity, euphoria, and a boost in productivity). *Cannabis sativa* typically has lower levels of THC than *indica* and higher levels of CBD, thereby producing a mood-lifting (or energizing) effect experienced by the consumer.

In contrast, *cannabis indica* comprises levels of THC higher than *sativa* and levels of CBD lower than *sativa*, thereby producing a mood-lifting effect (a sedative and relaxing "body high") experienced by the consumer (effects such as, e.g., relaxation, reduced pain sensation, calm, balance, aids in sleeping, etc.).

One classification system for describing attributes of a *sativa* plant can include appearance (e.g., height, width, stem and leaf descriptors), aroma and flavor (e.g., sweet, mango, etc.), CBD+THC ratio (%) (CBD=1-12%, THC=as high as 21-22%), common terpenes (e.g., myrcene, limonene, caryophyllene, pinene), and, benefits and effects (energy, mood, anti-stress). The classification system for describing attributes of an *indica* plant can include appearance (e.g., short, dense, busy, and height descriptors), aroma and flavor (e.g., pungent skunky, earthy, etc.), CBD+THC ratio (%) (CBD=1-18%, THC=as high as 23-25%), common terpenes (e.g., myrcene, limonene, valence, pinene), and, benefits and effects (sleep, relaxation, sedation, anti-stress).

Incense

There are at least four types of incense (and associated elements): a dab oil concentrate, a stick incense with coarse and/or powdered marijuana, cone incense with powdered marijuana, and, a smudge incense for short burns and then can be reused for subsequent burns until completely consumed.

Generally, the first type of incense is regular incense with dab oil concentrate. This is a predetermined amount (e.g., a pound) of marijuana from which is processed a small number of drops of dab oil, and which oil can include a significant potency (e.g., greater than or equal to 50%) of THC.

The second type of incense is a standard stick incense; however, the body of the incense is made from powdered marijuana with added spices and burning agents such as makko powder (generally, Japanese for "incense powder", but which powder can be used as a base binder for binding recipes of incense for various desired shapes and forms (e.g., on sticks and into cones)). Thus, handmade incense formats (e.g., stick, cones, etc.) can use makko to enhance the construction technique of rolling onto the stick, for example, by hand, which can be a difficult process.

The third type is a similar formula as the second type, but formed into a smaller cone-shaped incense, which burns on its own without a central stick.

The fourth type is marijuana leaves and buds folded into a smudge stick, similar to a sage smudge. This smudge can contain several incarnations, as this smudge can contain herbs, spices, the leaves of marijuana, and buds typically smoked in marijuana cigarettes (also referred to as "joints"). This fourth type is intended to be burned for a short time (e.g., few minutes), then extinguished, and where possible, reused at a later time until burned completely.

Returning to the first type of incense (referred to as "dab incense"), it is commonly known that some people enjoy the smell of marijuana and some people do not want to smell marijuana (burning or otherwise). The disclosed first types of incense products and processes are designed to satisfy both types of customers.

In one instance, a form of "dabbing" can be employed. Dabbing is the process of using a form (a "dab") of *cannabis* extract (e.g., butane hash oil). Once the creation process is completed by removing the butane, the result is a sticky and resinous product extract from which can be obtained "dabs" of the extract. This extract can range from 50-80 percent THC potency.

The dab incense is made according to the dab process described above and a small amount of concentrated marijuana oil(s). Thus, the disclosed dab (oil) can comprise both a high concentration of THC (e.g, the highest potency) and concentrated marijuana oils.

One attribute of dab incense is that the strength of the scent or aroma of the incense can be controlled to range from strong (or overwhelming or noticeable marijuana smell) to a weak (barely noticeable to entirely absent) marijuana smell, while yet retaining a high-level potency of THC.

By inhaling the dab incense as a second-hand smoke, the level of intoxication is minimal (lessened, relative to a more potent composition) and can compare to the inhalation of the terpenes of essential oils such as lavender or *eucalyptus*.

Terpenes (as a shortened and differently-spelled form of turpentine) are defined as a class of naturally-occurring organic hydrocarbons which are part of a plant and affect plant's smell (and "fruit", blossoms, etc.,) an associated fragrant aroma. For example, terpenes can be found in other organics, such as citrus fruits (e.g., the rinds), pine trees (e.g., the needles), black pepper plant (e.g., the pepper corns, etc.), and so on.

Specific to *cannabis*, the terpenes give the *cannabis* plant the associated fragrant aroma and taste, and other effects on the body and brain. *Cannabis* terpenes can be secreted from the *cannabis* flower resin glands as an oily, fragrant-imbued substance. Moreover, different varieties of *cannabis* plants can exhibit different corresponding fragrances, however slight the differences can be between plant varieties.

The dab incense can be produced in different scents such as coconut, amber, sage, and aloe, for example, to name just a few, and can be used calm people medicinally, similar to essential oils in aromatherapy. Accordingly, this incense is a popular form of incense, as many users can use the incense to camouflage the smell of marijuana and during medicinal use.

Turning to the drawings, FIG. 1 illustrates an incense cone 100 created and fashioned in accordance with a disclosed process. The incense cone 100 can be created using lemon grass and/or palo santo incense, and fashioned (formed) as a geometric solid (e.g., cone). It is to be understood that other geometric shapes can be employed for the incense, such as for example, spheres, semi-spheres, rectangles, squares, cylinders, pyramids, tetrahedrons, etc.

Figure 2:
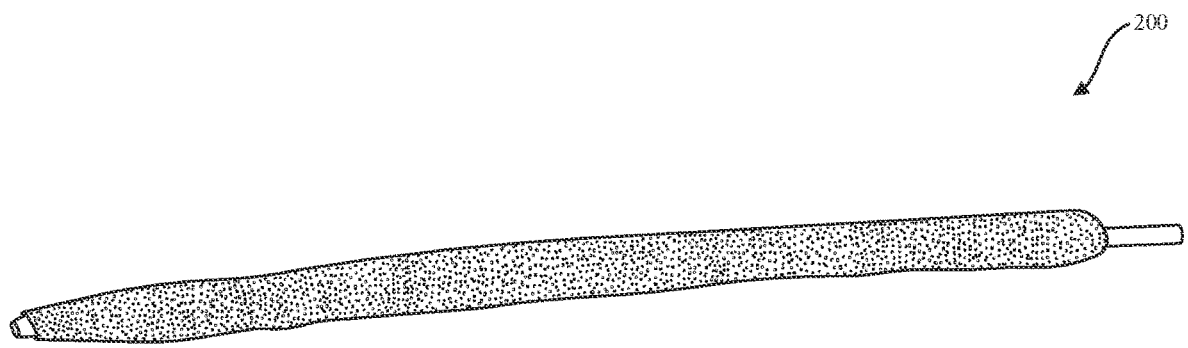
FIG. 2 illustrates an incense stick of palo santo incense created and fashioned in accordance with a disclosed process.

FIG. 2 illustrates an incense stick 200 created and fashioned in accordance with a disclosed process The stick 200 can include, but is not limited, to palo santo, lemon grass, and other single plant or combination of aromatic plants which can be used as incense.

Figure 3:
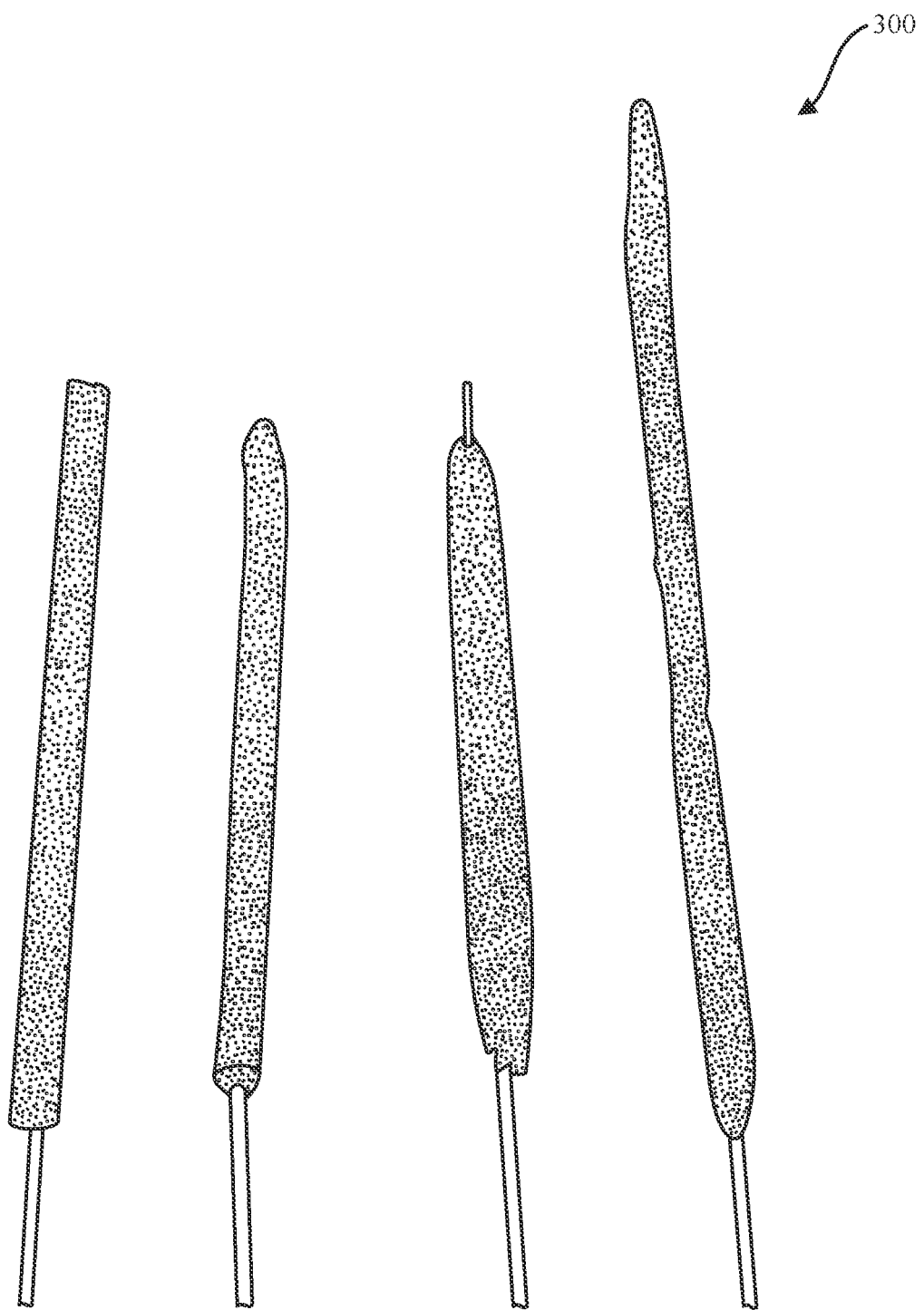
FIG. 3 illustrates a set of incense sticks created and fashioned in accordance with a disclosed process.

FIG. 3 illustrates a set 300 of incense sticks created and fashioned in accordance with a disclosed process.

Figure 4:
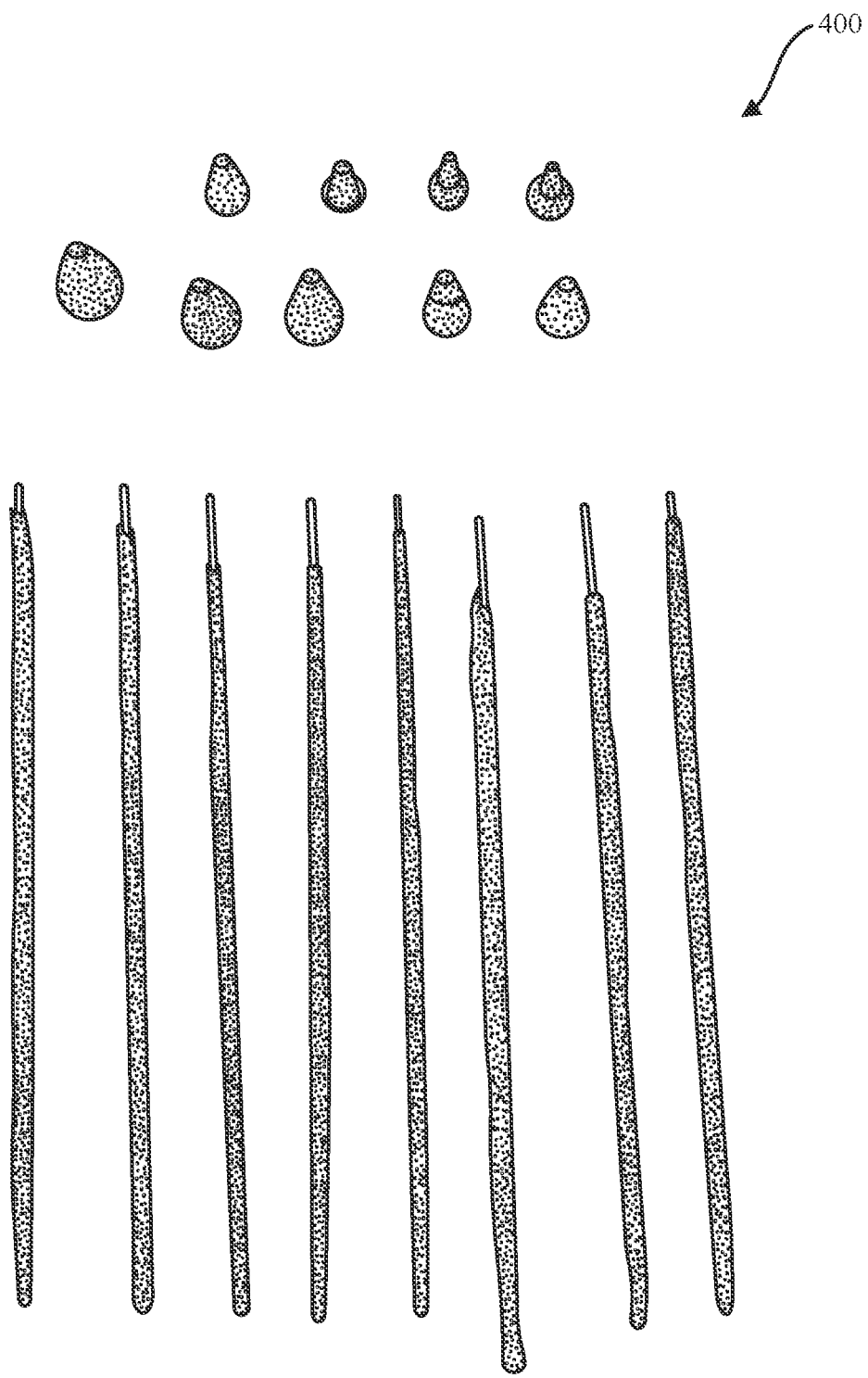
FIG. 4 illustrates a set of incense sticks and cones created and fashioned in accordance with a disclosed process.

FIG. 4 illustrates a set 400 of incense sticks and cones created and fashioned in accordance with a disclosed process.

Soaps

Figure 5:
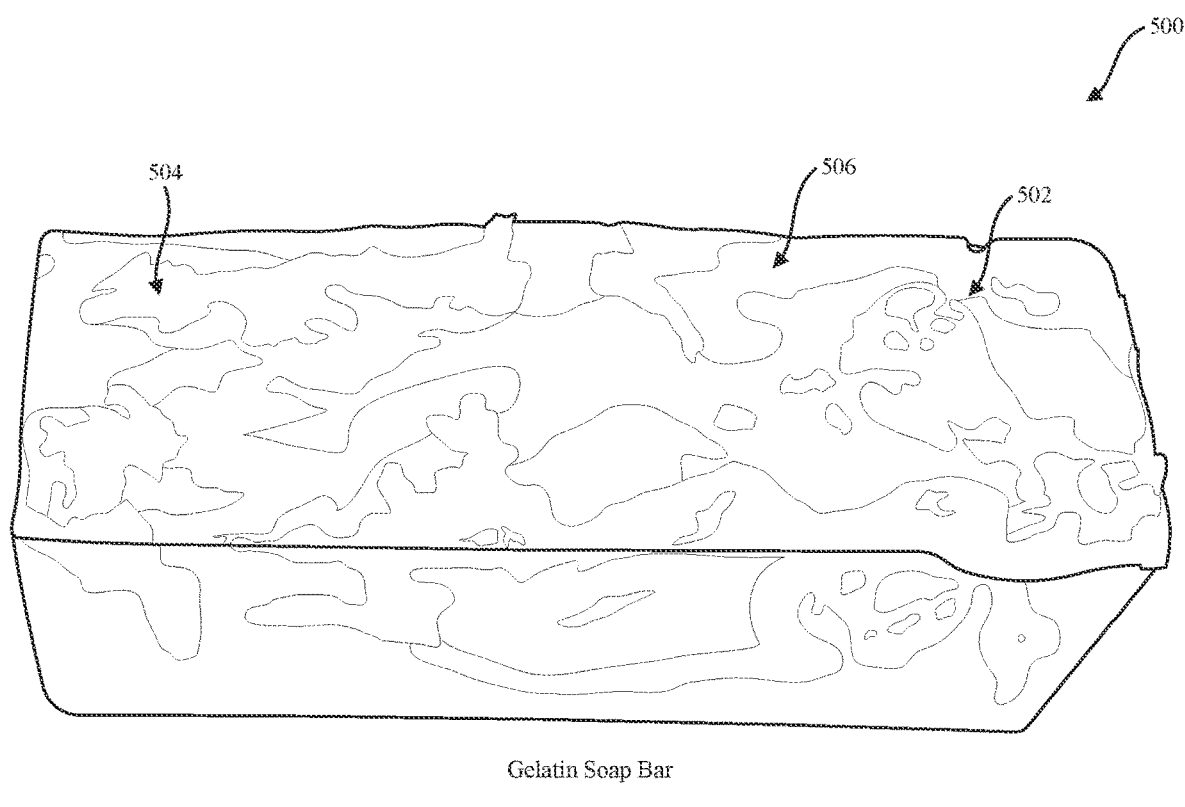
FIG. 5 illustrates a rectangular gelatin soap bar infused with sea moss and/or Irish moss created and fashioned in accordance with a disclosed process.

FIG. 5 illustrates a rectangular gelatin soap bar 500 infused with sea moss 502 and/or Irish moss 504 created and fashioned in accordance with a disclosed process. The one or more mosses (e.g., 502, 504, etc.) can be mixed into a gelatin soap base 506 to be exposed at the surface (one or more of the six sides) of the bar 500, infused entirely within the bar 500 (no surface exposure on any of the six sides), or partial exposure of one moss at or above the surface with no exposure of the other moss at the surface, etc. Here, the bar 500 includes both the sea moss 502 and the Irish moss 504, with both mosses "breaking" the surface on one or more sides of the bar 500 for a fashioned visual effect. It is to be understood that the bar 500 can also be infused with oils (e.g., CBD) and aroma(s) for a desired effect.

Figure 6:
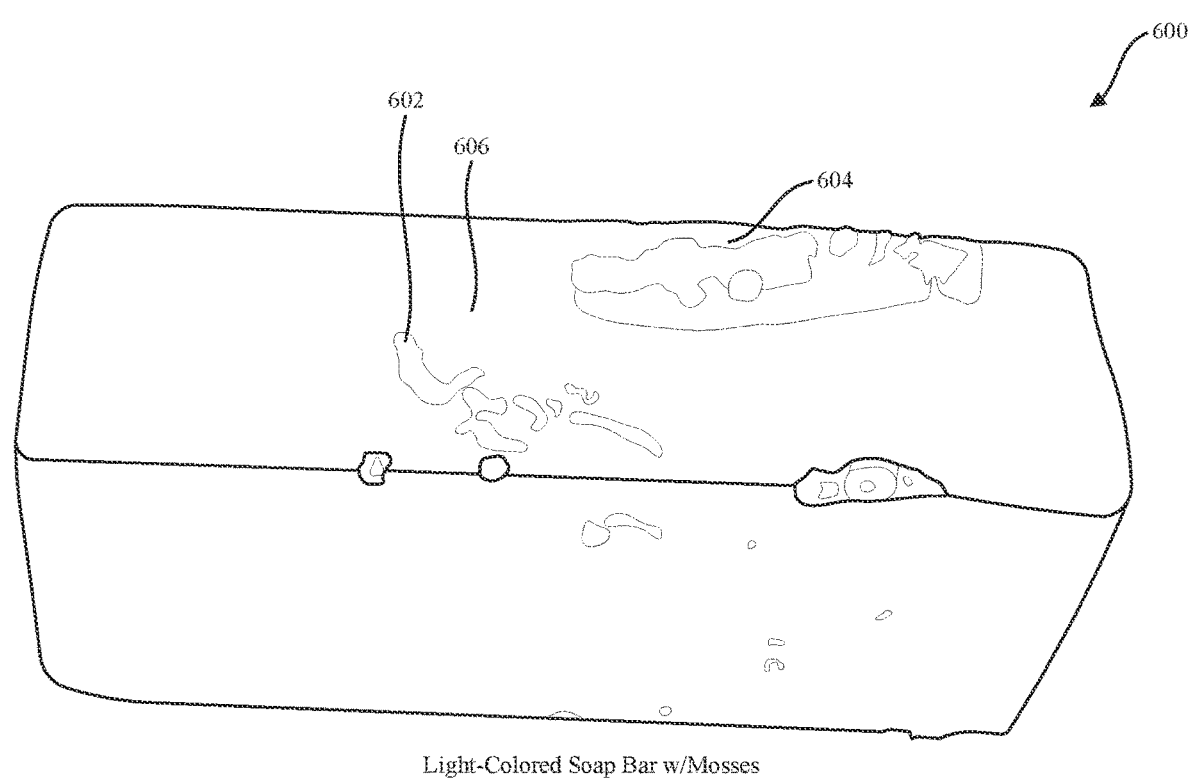
FIG. 6 illustrates a rectangular white soap bar infused with sea moss and/or Irish moss created and fashioned in accordance with a disclosed process.

FIG. 6 illustrates a rectangular soap bar 600 infused with sea moss 602 and/or Irish moss 604 into a white or cream-colored soap base 606 created and fashioned in accordance with a disclosed process. The bar 600 is similar to bar 500 in shape and composition, except for the color and soap base 606 employed. As above, the one or more mosses (e.g., 602, 604, etc.) can be mixed into the soap base 606 to be exposed at the surface of the bar 600, infused entirely within the bar 600 (no surface exposure but entirely in the soap base 606), or partial exposure of one moss at or above the surface with no exposure of the other moss at the surface, etc.

Here, the bar 600 includes both the sea moss 602 and the Irish moss 604, with some moss exposed at the surface and other portions of the moss mixed into the base without exposure at the surface. It is to be understood that the bar 600 can also be infused with oils (e.g., CBD), aroma(s), and particulates (e.g., smaller pieces of plants) for a desired effect.

Figure 7:
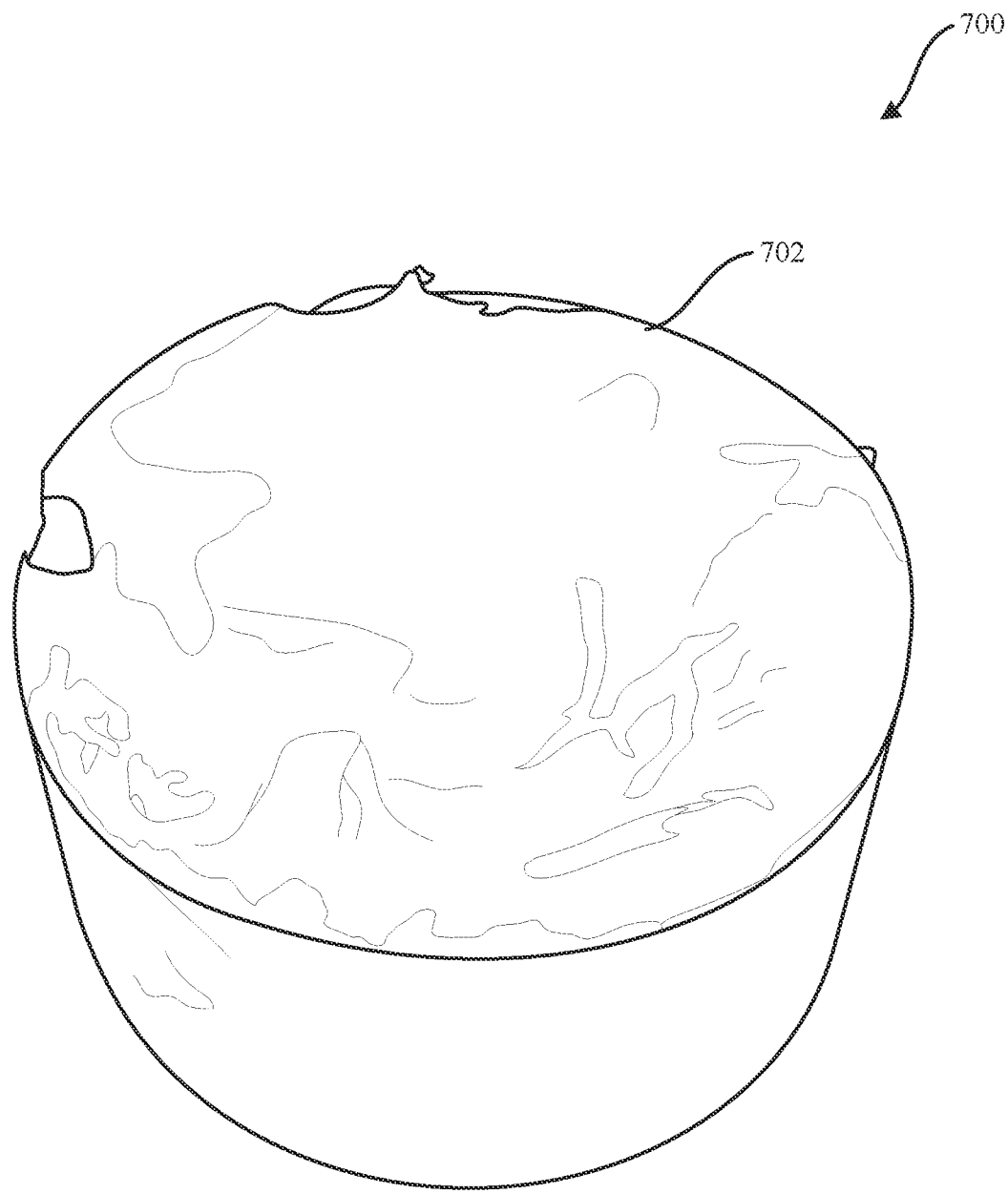
FIG. 7 illustrates a circular gelatin soap wheel created and fashioned in accordance with a disclosed process.

FIG. 7 illustrates a circular gelatin soap bar "wheel" 700 created and fashioned in accordance with a disclosed process. The soap bar 700 is created and fashioned as a cylinder of gelatin as the soap (or bar) base 702. However, the bar base 702 can also be infused with oils (e.g., CBD), aroma(s), and/or other particulates (e.g., smaller pieces of plants, seeds, etc.) for a desired effect.

Although not shown here, the bar 700 can be created with a composition similar to bar 500 of FIG. 5, with one or more mosses. For example, one or more mosses (e.g., sea moss, Irish moss, etc.) can be mixed into the gelatin soap base 702 to be exposed at the surface (one or more of the three sides (top, bottom, and perimeter side)) of the bar 700, infused entirely within the bar 700 (no surface exposure on any of the three sides), or partial exposure of one moss at or above the surface with no exposure of the other moss at the surface, etc.

Figure 8:
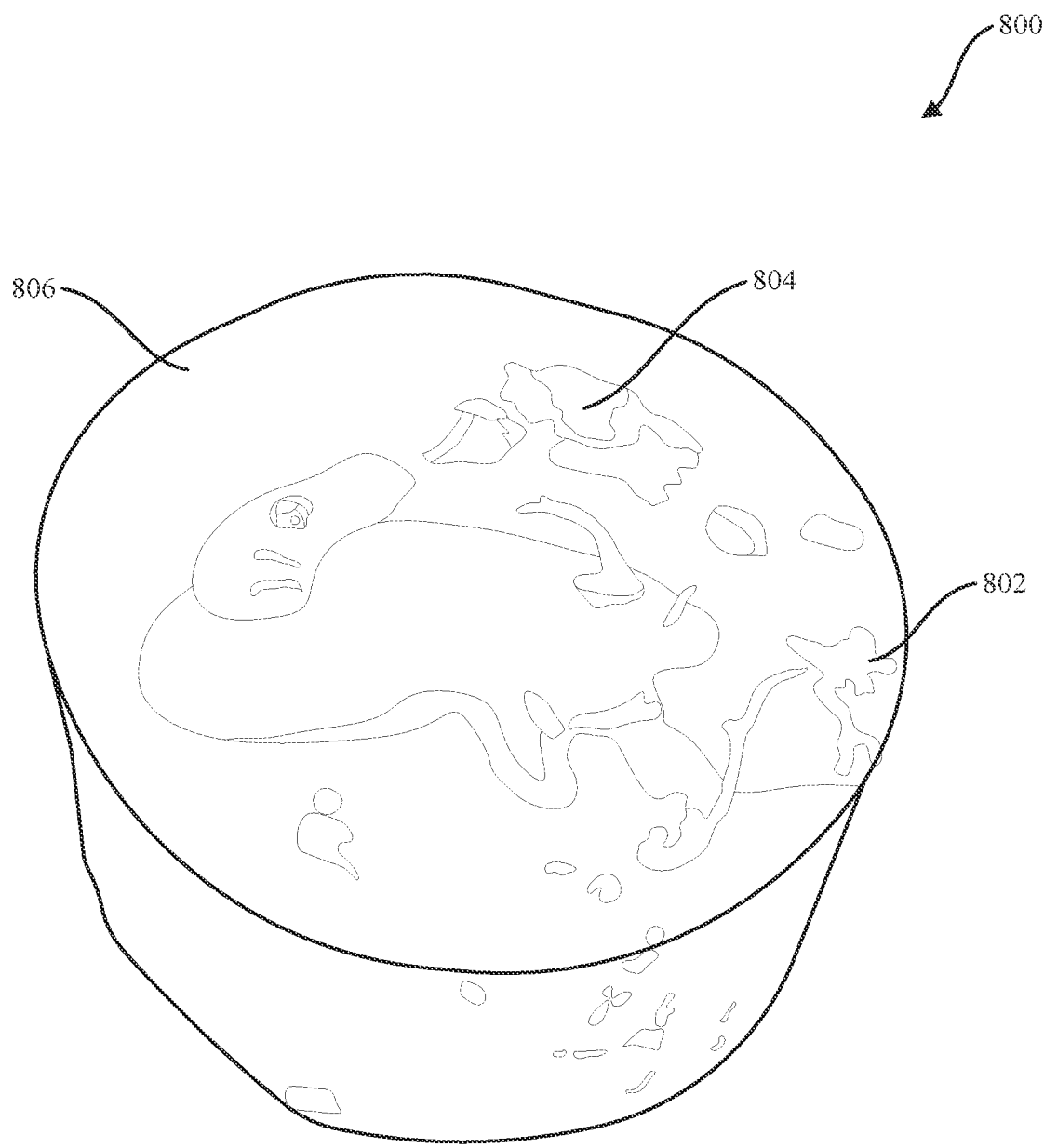
FIG. 8 illustrates a circular white soap wheel infused with sea moss and/or Irish moss created and fashioned in accordance with a disclosed process.

FIG. 8 illustrates a circular light-colored soap bar "wheel" 800 infused with sea moss and/or Irish moss created and fashioned in accordance with a disclosed process. The bar 800 is different in shape from bar 600, but similar in color and soap base composition employed for bar 600. As above for FIG. 6, one or more mosses 802 and 804 (e.g., similar to mosses 602 and 604.) can be mixed into the soap base 806 to be exposed at the surface (top, bottom, and perimeter side) of the bar 800, infused entirely within the bar 800 (no surface exposure but entirely in the soap base 806), or partial exposure of one moss at or above the surface with no exposure of the other moss at the surface, etc.

In other words, the one or more mosses (e.g., sea moss, Irish moss, etc.) can be mixed into the soap base 806 to be exposed at the surface (one or more of the three sides (top, bottom, and perimeter side)) of the bar 800, infused entirely within the bar 800 (no surface exposure on any of the three sides), or partial exposure of one moss at or above the surface with no exposure of the other moss at the surface, etc. It is to be understood that the bar 600 can also be infused with oils (e.g., CBD), aroma(s), and particulates (e.g., smaller pieces of plants) for a desired effect.

Figure 9:
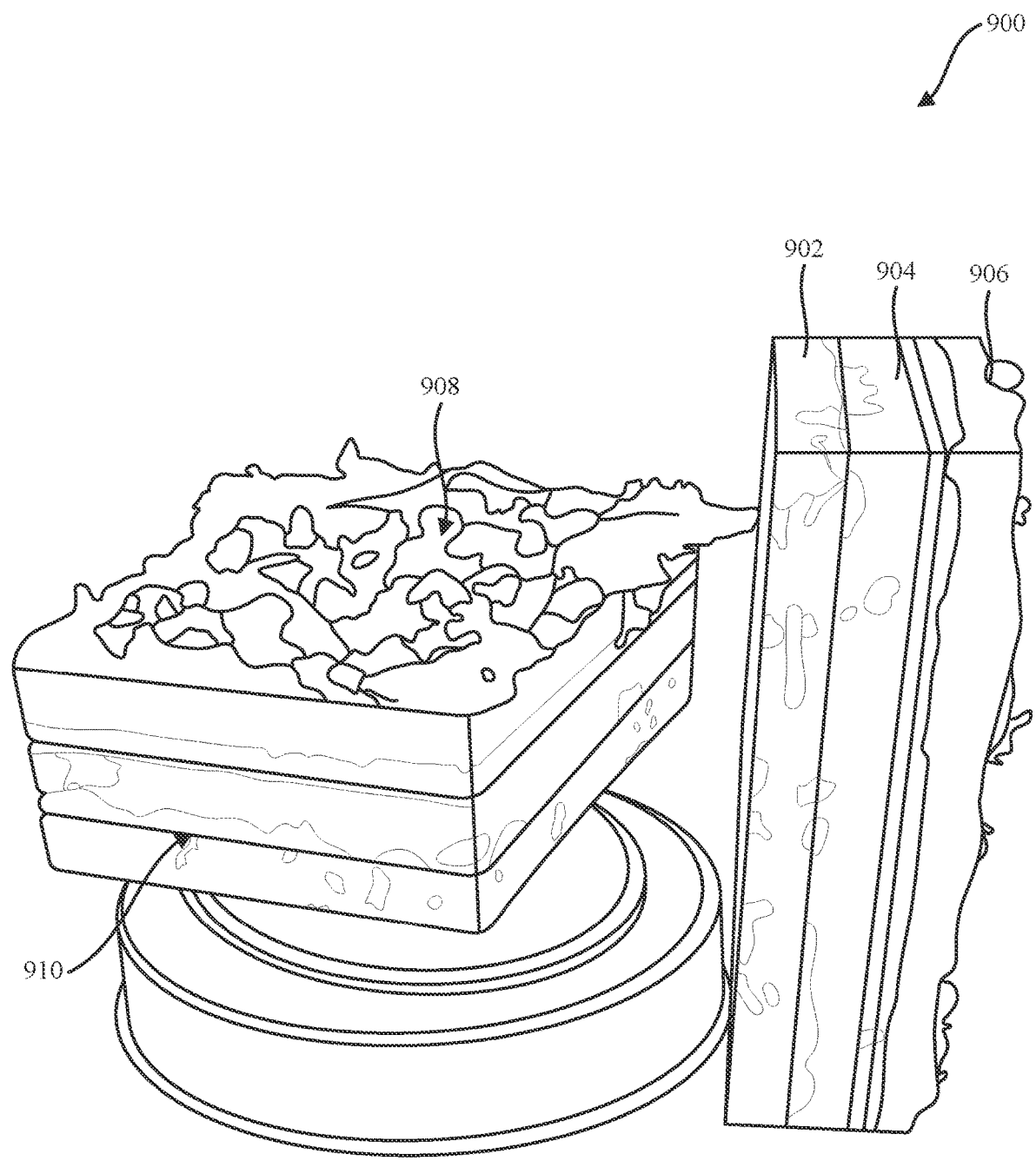
FIG. 9 illustrates a layered and ornamentally fashioned bar of soap created in accordance with a disclosed process.

FIG. 9 illustrates a layered and ornamentally created and fashioned soap bar 900 created in accordance with a disclosed process. The bar 900 shows at least three layers: a base layer 902 having a generally base substance (e.g., white colored), a second interstitial layer 904 of a substance (e.g., a gelatin) having a degree of transparency (e.g., ranging from clear to cloudiness to entirely opaque), and a top layer 906 overlaying the second layer 904 and predominantly comprised of a substance (e.g., white colored) on which added particulates 908 can be applied, if desired.

For example, the particulates 908 can comprise material shavings (e.g., soap), plant material (e.g., mosses, *cannabis*, etc.), aromatic materials (e.g., incense plant dustings, essential oils, CBD oil(s), etc.), that when applied to the top layer 906 are affixed to the top surface and express a desired fragrance from the product soap The base layer 902 can also have mixed-in (or blended) materials 910, and other desired substances (e.g., *cannabis*, oils, fragrances, etc.), which then provide a marbling effect visible to the user.

Figure 10:
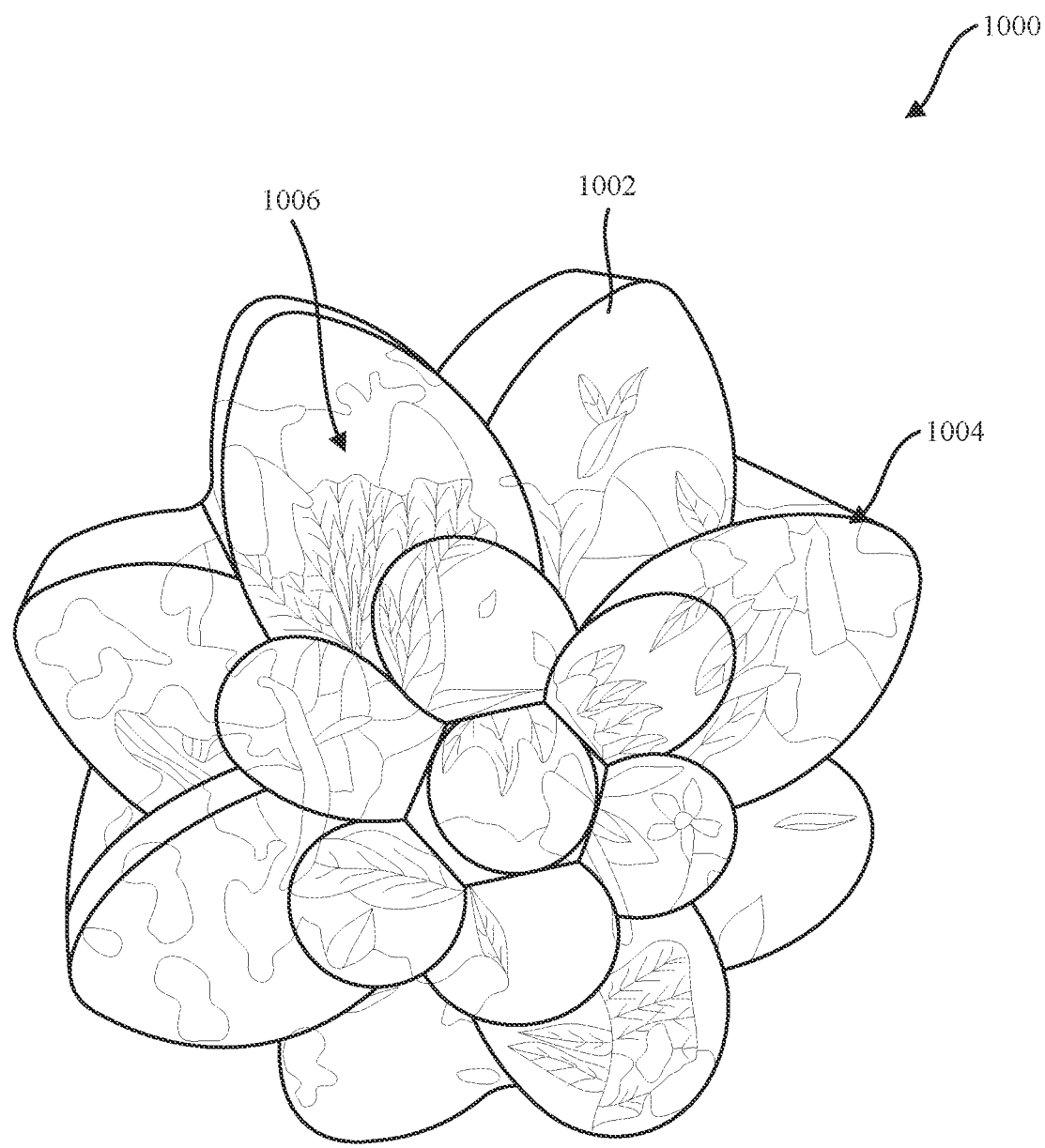
FIG. 10 illustrates a circular flowered-shaped-based soap infused with sea moss and/or Irish moss created and fashioned in accordance with a disclosed process.

FIG. 10 illustrates a circular multi-petaled flowered-shaped soap 1000 infused at least with sea moss and/or Irish moss created and fashioned in accordance with a disclosed process. The soap 1000 (e.g., ornamental) can be shaped as a flower, which shape can be accomplished using a flower mold (not shown) and into which a base substance 1002 is poured. The base substance 1002 can comprise other mixed-in materials/substances such as moss, oils, fragrances, colorations, and so on. A top presentation layer 1004 can then be applied and affixed to the top surface of the base substance 1002.

The presentation layer 1004 can further comprise coarse materials such as moss parts, *cannabis* plant parts, and/or other particulates 1006 which can then be molded onto the upper surface of the base substance 1002 using a substantially clear substance 1008, which enable viewing of the soap 1000 and other visible features such as the particulates 1006 and base substance 1002 and blended-in materials/substances. In many instances, such products such as the soap 1000 are simply used as ornamental products to adorn a specific location such as the bathroom, while expressing aromas and scents desired by the user.

Figure 11:
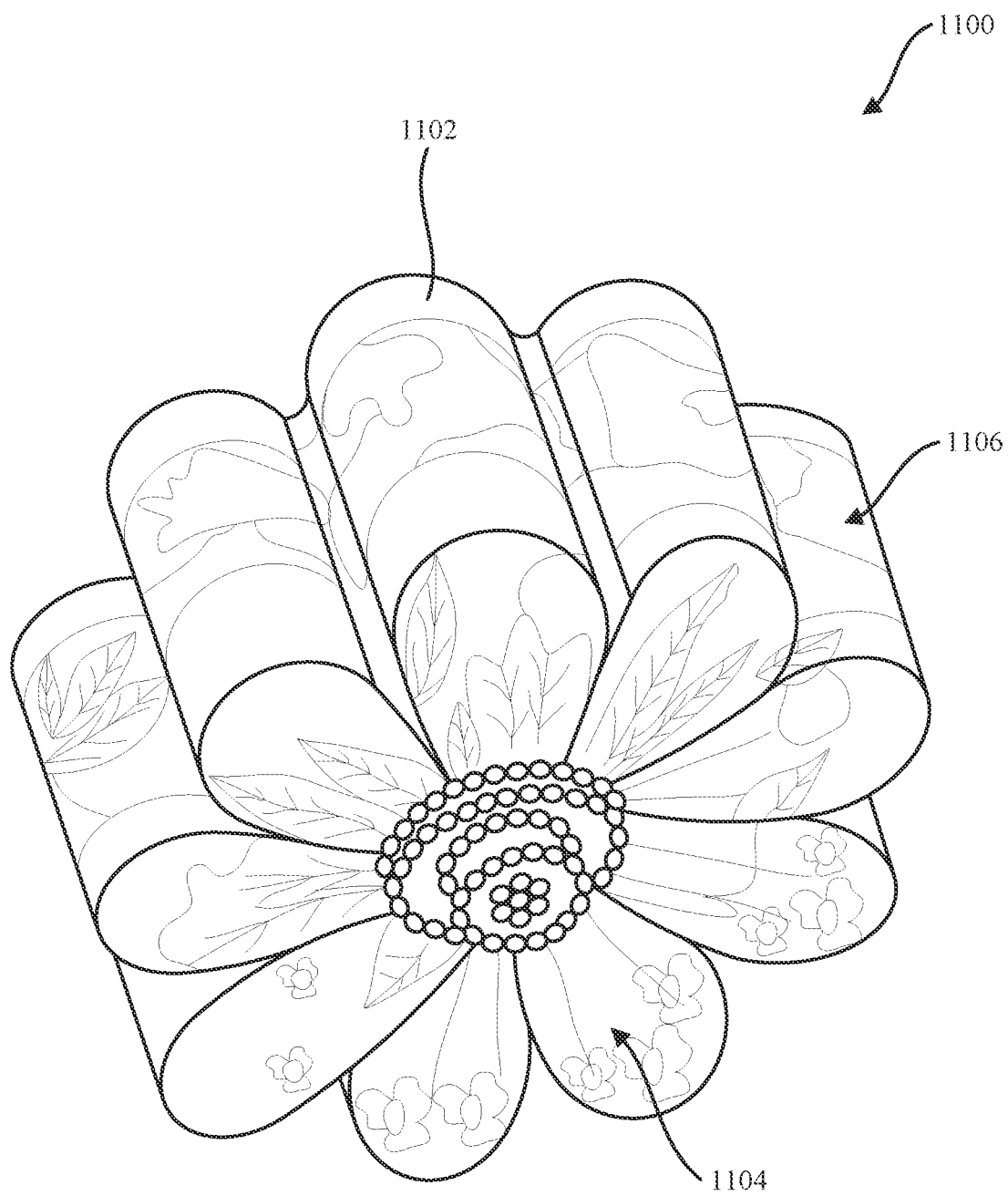
FIG. 11 illustrates a circular flowered-shaped gelatin-based soap infused with sea moss and/or Irish moss created and fashioned in accordance with a disclosed process.

FIG. 11 illustrates a circular multi-layered flower-shaped soap 1100 having a gelatin base infused with sea moss and/or Irish moss and various layers as created and fashioned in accordance with a disclosed process. The soap 1100 can be used solely as an ornamental product which can be created to emit aromas of *cannabis*, essential oils, perfumes, etc.

Production of the soap 1100 can include mixing and inserting the base substance 1102 on which other (e.g., subsequent) layers and layer particulates, substances, and items can be incorporated. The layered soap 1100 can take several iterations of adding subsequent layers of same or different colored layer base substance and any coarse matter blended into that specific layer.

It is also to be appreciated that any of the soaps, bars, etc., described herein can be produced in a reverse order as initially described in association with production of a given product. For example, as applied to the soap 1100, the base substance 1102 can alternatively be designated as what appears to be the top or forward-facing surface 1104 of the flower soap 1100. Thus, production can include first creating the top or forward-facing surface 1104 of the soap 1100 as depicted, by pouring into a mold the base substance 1102 and then inserting the subsurface ornamental materials. Thereafter, in several iterations in reverse order, the intermediate layers 1106 can be created and added as desired, until the process ends at what is initially referred to as the base 1102. Coloration for the various layers can be determined and applied to make the product appealing to the user.

Staged Collections of Products

Figure 12:
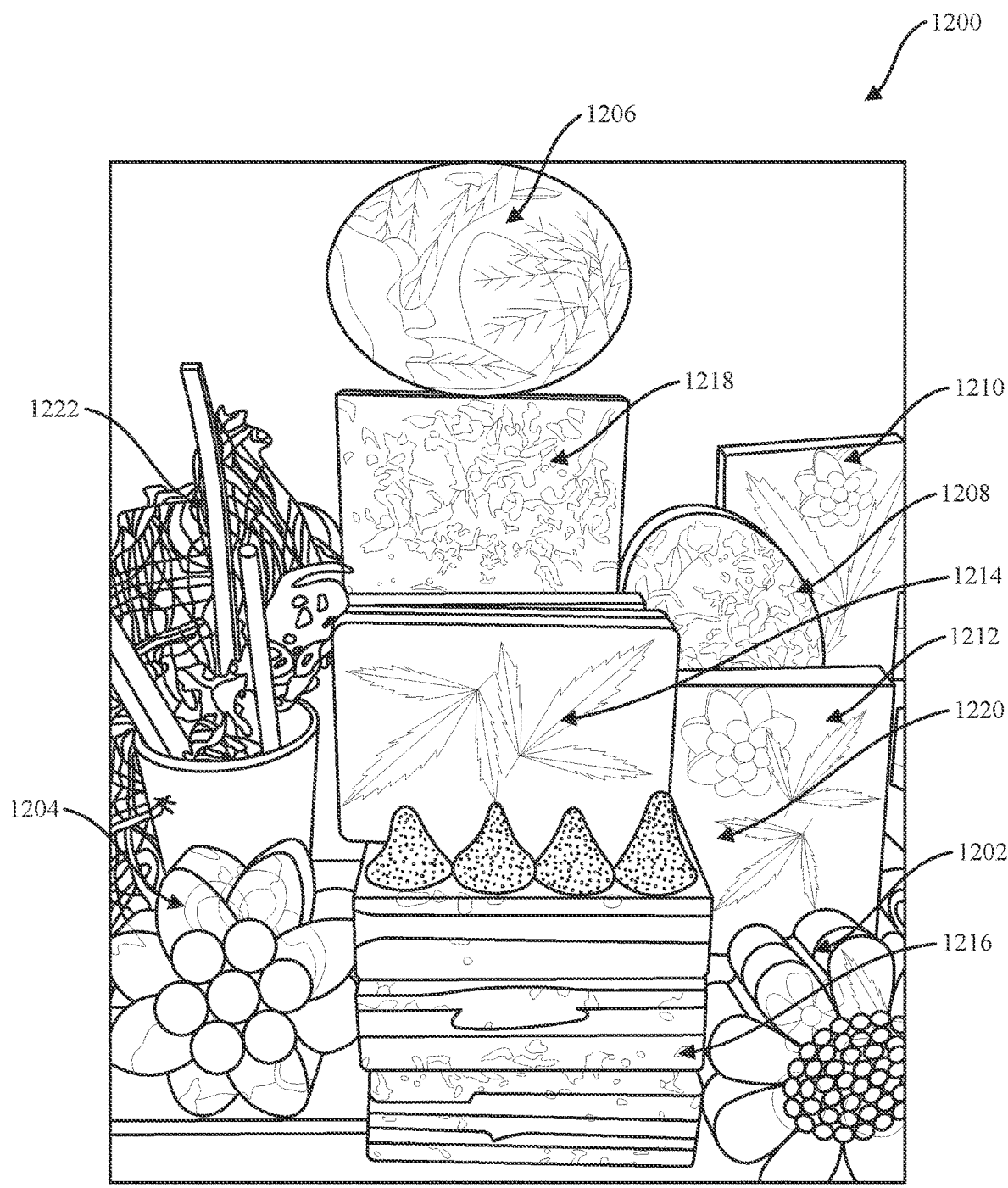
FIG. 12 illustrates a staged collection of incense and soaps created and fashioned in accordance with a disclosed process.

FIG. 12 illustrates a staged collection 1200 of incense and soap products created and fashioned in accordance with a disclosed process. The collection includes two flower-petal soaps (1202, 1204), ovate soaps (1206, 1208), single- and multi-layered, multi-colored, and ornamental rectangular soap bars (1210, 1212, 1214, 1216, 1218) that ultimately can be used normally as cleansing soaps in baths and showers, for example. The collection 1200 also includes cone incense 1220 of different colors and aromas (or scents), as well as stick incense 1222 of different colors, oils, and aromas (or scents).

Figure 13:
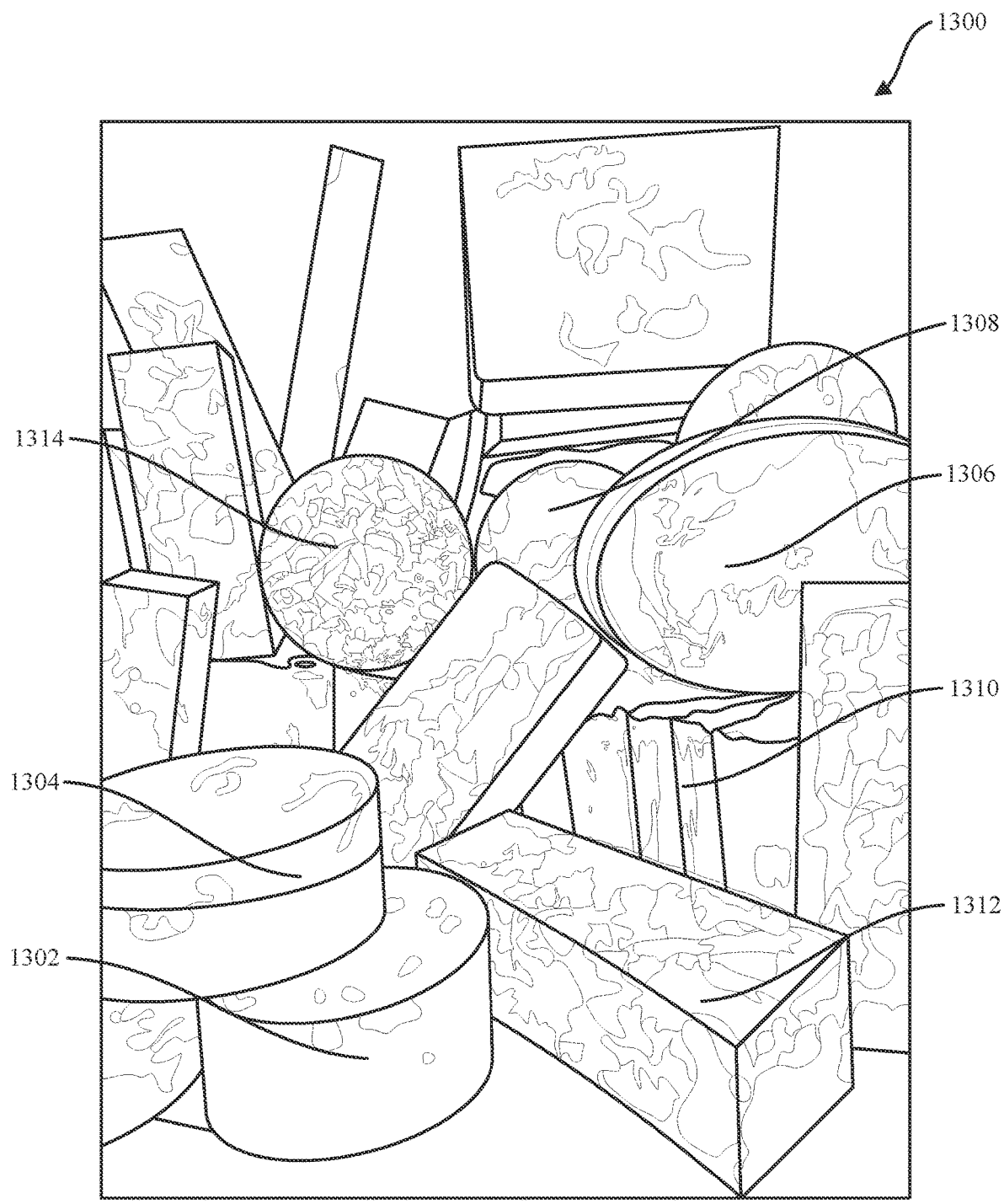
FIG. 13 illustrates a staged collection of soap products created and fashioned in accordance with a disclosed process.

FIG. 13 illustrates another staged collection 1300 of soap products created and fashioned in accordance with a disclosed process. The collection 1300 includes soap wheels: a single base substance soap wheel 1302 which further includes mixed-in particulates, and a multi-layered soap wheel 1304 of two layers; a gelatin layer and white-colored layer with moss blended therein The collection 1300 also includes an ovate (elliptical shaped) gelatin bar 1306 and a circular gelatin bar 1308 (also referred to herein as a soap wheel). The collection 1300 can also include gelatin bar soaps 1310 as well as infused gelatin bars 1312 with internal particulates, oils and medications for ornamental, aromatic, and medicinal attributes. Other soaps and aromatic products such as bath bombs 1314, etc., are shown and can provide the benefits and attributes described herein.

Figure 14:
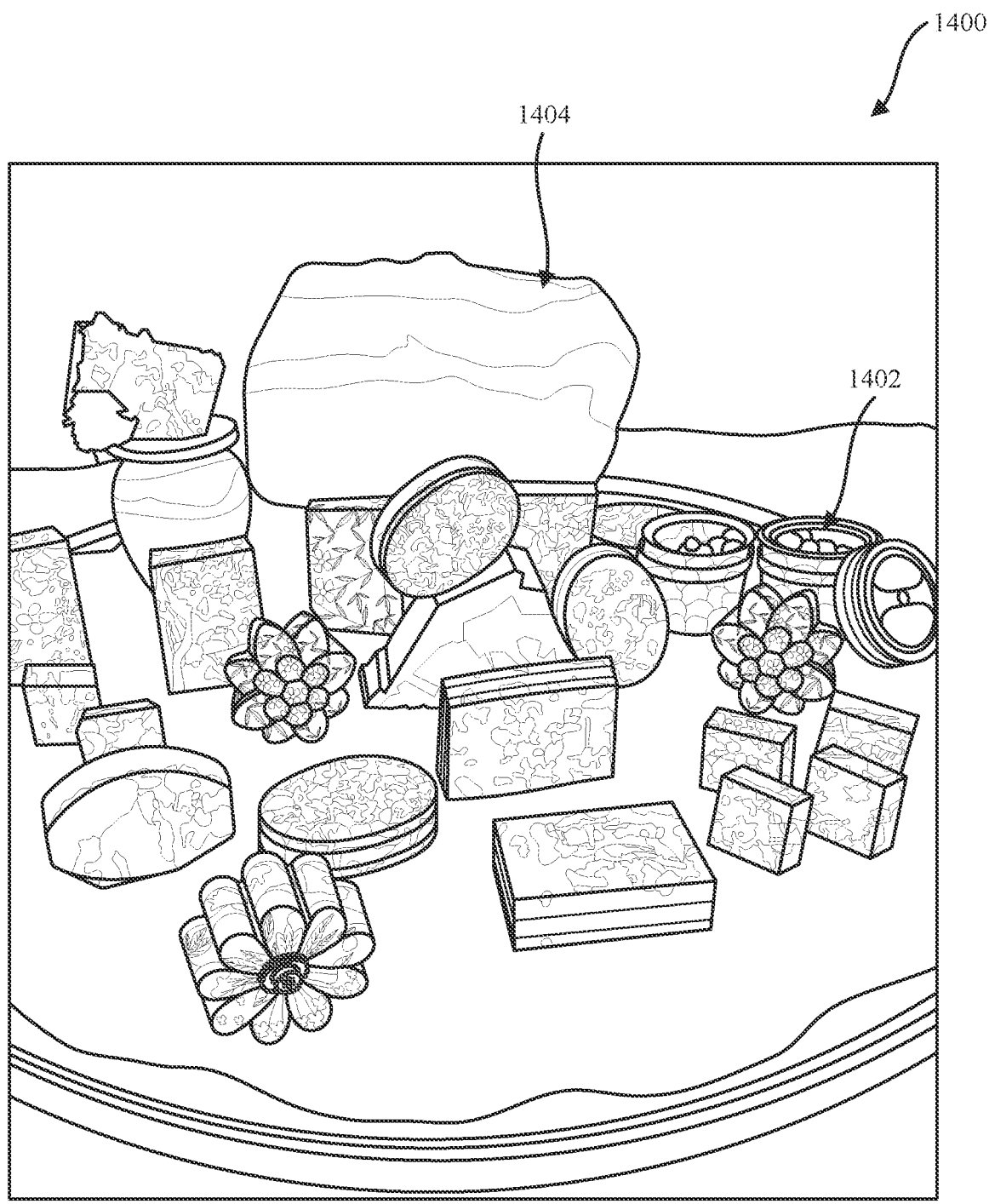
FIG. 14 illustrates a similar staged collection of soap products created and fashioned in accordance with a disclosed process.

FIG. 14 illustrates a similar staged collection 1400 of soap and loosely contained aromatic products created and fashioned in accordance with a disclosed process. The loosely contained particulates can be covered in a glass jar 1402, for example, enclosed with a lid. Thus, the user can stop further release of aromas, scents, oils, etc., by simply replacing the lid to the jar.

In this specific collection 1400, an irregularly-shaped disk 1404 which appears similar to a flat piece of quartz or granite rock, can be placed at a location where infused scents and oils can express into the surrounding area to deliver the desired attributes (e.g., medicinal effects, etc.) for enjoyment by the user(s).

Figure 15:
FIG. 15 illustrates a similar staged collection of soap, lotion, and bath products created and fashioned in accordance with a disclosed process.

FIG. 15 illustrates a similar staged collection 1500 of soap, lotion, and bath products created and fashioned in accordance with a disclosed process. This collection 1500 depicts lotion containers 1502 which contain lotions and creams comprised of one or more of oils, CBD, *cannabis*, scents, particulates, and so on, to attain the desired effect(s) for the specific product. This collection 1500 also depicts tea containers 1504 of chamomile tea, for example, formulated for consumption, either separately or in combination with aloe vera and other components.

Incense Recipes

Following is a generalized process associated with producing minimally scented or unscented dab oil incense sticks. First, receive a quantity of unscented incense-type sticks. The sticks can be of wood pulp and/or charcoal pulp, for example. Next, one or more drops (e.g., five) of one or more essential oils (e.g., rose, lavender, lemongrass, and sandalwood) are added to each stick (now referred to as "oiled sticks"). Then, the oiled sticks can be allowed to dry a specific amount of time (e.g., twelve hours). After drying, the oiled sticks can be further coated with a quantity of dab oil (e.g., five milligrams (mg)). Next, the dab-coated oiled sticks are coated again, but with powdered at least one of marijuana, *sativa*, or *indica*. Next, the dab-coated and powder-coated sticks can be dried for a specific amount of time (e.g., twelve hours).

Any of the above steps can be modified to achieve the desired effect(s). For example, the number and type of drops of the essential oils can be changed, as well as the composition of the sticks, and the number of coating operations using the dab oil.

Recipe for Incense-Unscented Prepared Sticks w/Dab
  Receive sticks: obtain one package of wood pulp or charcoal pulp unscented incense sticks (the typical handle and interior support structure of incense on a stick);
    Add drops: 5 drops (typically 0.5 ml) of any one or more of essential oils (e.g., rose, lavender, lemongrass, and sandalwood) to each stick;
    Dry: Allow to dry for at least 12 hours;
    Add dab coating: add first coating to sticks in 5 mg of dab (marijuana concentrate);
    Add *cannabis* coating: add second coating of dab to sticks with powdered marijuana, *sativa*, and *indica* applied after the dab oil; and
    Dry: dry the coated sticks for at least 12 hours.

Incense-Scented Powdered *Cannabis* on Stick
  The second type of incense can be termed "Marijuana Incense". For those consumers who enjoy the smell and effects of marijuana, this incense is produced with actual marijuana, which makes this incense a convenient way to enjoy the smell of marijuana without smoking it, in the traditional sense (e.g., hand-to-mouth). This can be done by using *indica* (for its calming affect), and/or *sativa* (for a boost of serotonin for energy or appetite stimulant). Here, the marijuana is crushed or ground (e.g., to a coarse consistency, to a powder consistency, etc.) and applied to a stick (e.g., such as typically employed by stick incense), for handling and use convenience.

Incense-Cone With Powdered *Cannabis*
  The third type of incense can use the same construction and formula as the second type above, but formed into a little cone, which can be free-standing and can burn on its own (without a central stick). Thus, as above, for those customers who enjoy the smell of marijuana, this incense is produced with marijuana, which makes this incense a convenient way to enjoy the smell of marijuana without smoking it. This can be done by using *indica cannabis* (for its calming affect), and/or *sativa cannabis* (for a boost of serotonin for energy or appetite stimulant). Here, the marijuana can be crushed (coarseness) or ground (e.g., to a coarse consistency, to a powder consistency, etc.) and formed into (by mixing with a component that retains shape, yet burns at a slow rate) the smaller cone-type shape, for handling and use convenience.

Recipe for Stick and Cone Incense w/Dab Oil
  Begin: obtain marijuana incense sticks (support and handling) and cones (e.g., one package of wooden split sticks (e.g., marijuana sticks) and cones);
  Measure quantities of the following ingredients:
    A quantity (e.g., 3 tsp) of wood powder (e.g., Sandalwood) base material;
    A quantity (e.g., 2 tsp) of powdered marijuana (e.g., *sativa* and/or *indica*);
    A quantity (e.g., 1 tsp) of powdered cinnamon;
    A quantity (e.g., $\frac{1}{4}^{th}$ tsp) of resin (Peruvian Myrrh resin of species *Styrax weberbaueri*); and
    A quantity (e.g., $\frac{1}{8}^{th}$ tsp) of a gum (e.g., Tragacanth, a natural gum obtained from the sap of Middle Eastern legumes of genus *Astragalus*. (Tragacanth is a viscous, odorless, tasteless, water-soluble mixture of polysaccharides, which provide thixotropy to a solution (forms a pseudoplastic solution—a gel)).
  Dry the above ingredients thoroughly. Once dried to a predetermined dryness parameter;
  Mix in (e.g., vigorously) a quantity (e.g., 3½ tsp) of rosemary (or other) tea to break down (apart) the (liquid) surface tension and mix in (combine or blend) the wet and dry ingredients thoroughly to create a doughy mixture;
  When the doughy mixture separates (breaks apart) into small pieces (e.g., into the size of peas), knead (e.g., by hand) the mixture to disperse moisture throughout the doughy mixture (doughy mixture can be formable into peas-sized ball(s)); and
  Mix in one or more essential oils (e.g., 5 drops).
  Begin the formation process. For each quantity and shape (or form) desired (e.g., cone, stick), obtain measured portion (e.g., ¼ tsp) of doughy mixture, and;
  form (e.g., roll) the measured portion into a shape of a cone, or
  roll (to expand) the measured portion into a length of dough (e.g., by hand), press a length of the stick into the length of dough leaving a portion of the stick free of dough (as a handle), and forming (e.g., rolling) the remaining sticked length to surround (encompass) the remaining stick entirely with the dough, repeat until quantity and shapes are made.
  Then, dry the quantity of shapes which are formed (e.g., dry for at least twelve hours);
  apply dab coat (e.g., 5 mg of marijuana concentrate) to incense; and
  apply coat of powdered marijuana to incense (cone and/or stick) to facilitate the drying process (e.g., of the final stick incense product)

Incense-Smudge Using Bundled *Cannabis* and Stems

The fourth type of incense is termed a "marijuana smudge". As with a similar product (e.g., the Sage smudge), this incense is made with marijuana leaves while green, and the leaves are layered and tied together with a filament (e.g., string) before drying. After drying, this bundle can be used as a smudge "stick", where the marijuana smudge can be lit and then extinguished, for future reuse. The marijuana smudge can be created using a blend of *sativa* and/or *indica*, or used separately for the calming effects of *indica* or the stimulating effects of *sativa*.

Recipe for Marijuana Smudge Bundle Incense
- Provide: green marijuana leaves (*sativa* and/or *indica*);
- Provide: marijuana flowers (*sativa* and/or *indica*);
- Using a layering (or stack) of green marijuana leaves (e.g., three), place flowering buds (*sativa* and/or *indica*) (use *sativa* bud for stimulating effect and/or use *indica* bud for its calming effect) inside the stack, which creates a bundle;
- Optionally, use separately or in combination with one or more botanicals (e.g., rose, sweet grass, dried rosemary, dried lavender, or any combination thereof);
- Add one or more drops of essential oils to the interior of the open bundle;
- Close the bundle by folding over the stack of leaves (or a single leaf);
- Wrap the oiled bundle with combustible or noncombustible filament (e.g., string, rope, wire, etc.) as can be similar to a Sage smudge plant stems product; and
- Dry for a span of time (e.g., three weeks); drying can be performed in different ways, e.g., suspending upside down, laying on trays, fans, etc.).

Lotions and Soaps

Lotion-Marijuana and Dab

When marijuana is added to a lotion, topically, there are no medical issues (also referred to as "an interference") when the user is taking one or more medications. While most lotions can soothe and moisturize, the marijuana lotion gently and effectively repairs the superficial layers of the skin. In one product implementation, the lotion contains 4% THC provided by dab marijuana concentration, 1% THC extract, 5% terpenes, and 3% CBD (which is below the legal limit). The healing can be more effective because of any one or more of other herbs and botanicals such as soothing Aloe Vera, vitamin E, five essential oils, chamomile and burdock root extracts, grape seed oil, and olive oil. (The THC levels can be maintained within the Federal Guidelines of the Regulatory Limits.)

The effects of CBD alone are notable; however, the introduction of THC with CBD at predetermined amounts, activates the CBD to an increased level of usefulness. Thus, increasing amounts of THC with CBD makes CBD a correspondingly more effective product. The ingredients of CBD and THC work hand-in-hand, topically, on the superficial layers of the skin. This product is intended to soothe and comfort minor aches and pains for an analgesic effect.

Recipe for Handmade Lotion—All Natural Ingredients—200 Gram Batch

Figure 16:
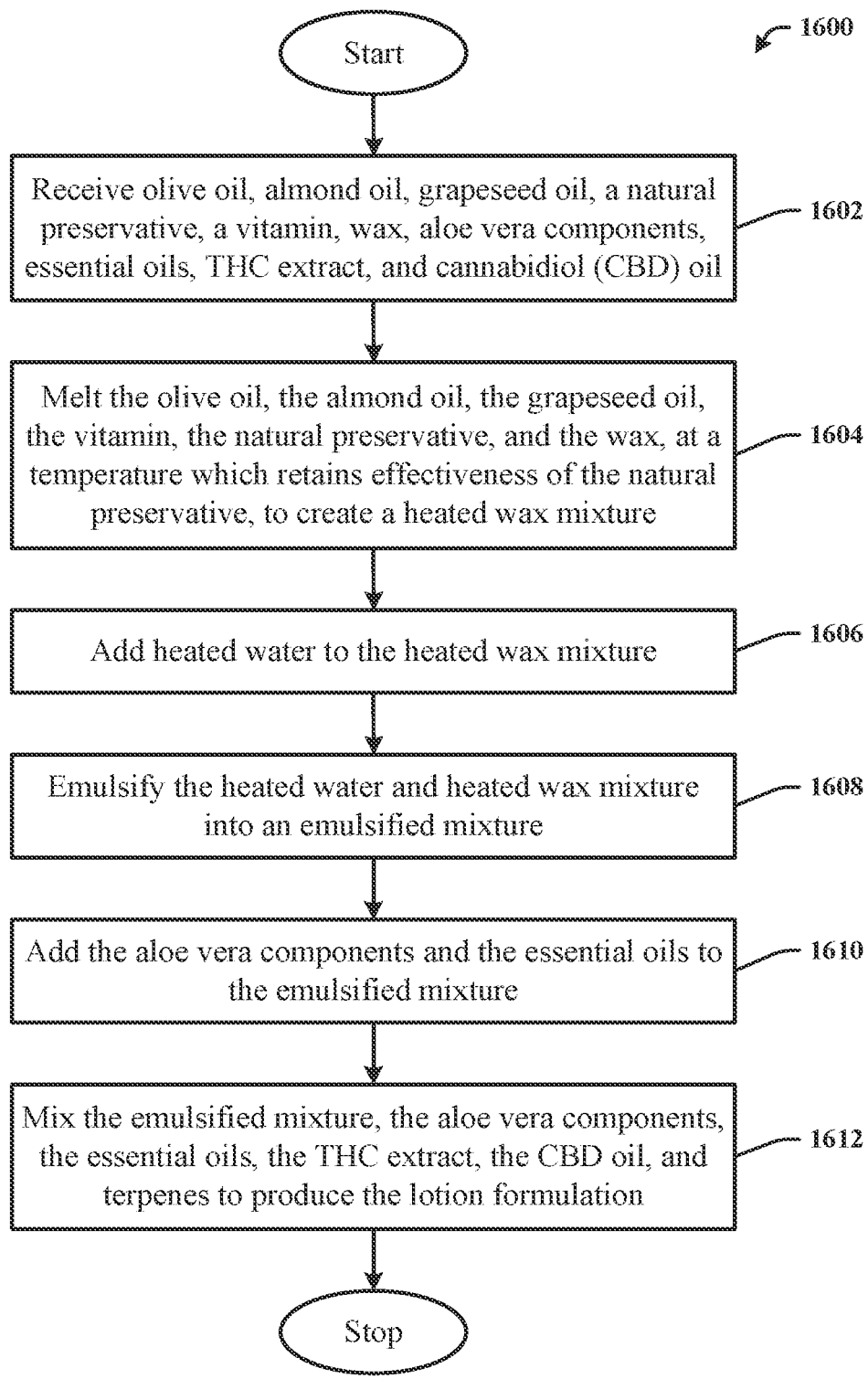
FIG. 16 illustrates a method of making a lotion formulation in accordance with a disclosed process.

FIG. 16 illustrates a method 1600 of making a lotion formulation in accordance with a disclosed process. The formulation for a 200-gram batch can begin, at 1602, receiving (obtaining) olive oil, almond oil, grapeseed oil, a natural preservative, a vitamin, wax, aloe vera components (at least one of aloe vera juice, aloe vera flesh, or aloe vera gel), essential oils, THC extract, and cannabidiol (CBD) oil The above can then be added and mixed: olive oil (e.g., 5 grams or 2.5% w/w), almond oil (e.g., 5 grams or 2.5% w/w), grapeseed oil (e.g., 5 grams or 2.5% w/w), a natural preservative (e.g., 2-4 percent (or about 2% w/w to about 4% w/w), Leucidal Liquid SF by Active Micro Technologies), vitamin E oil (e.g., 5 grams or 2.5% w/w), emulsifying wax (e.g, 10 grams or 5.0% w/w), aloe vera components, and essential oils.

At 1604, melt the olive oil, the almond oil, the grapeseed oil, the vitamin, the natural preservative, and the wax, at a temperature which retains effectiveness of the natural preservative, to create a heated wax mixture. Heat can be applied (e.g., in a microwave, gas burner, etc.) for about two (2) minutes—at or below 145 degrees F. (to enable retention of the effectiveness of the natural preservative) to melt the wax and heat the oils (e.g., olive oil, grapeseed oil, almond oil). Essential oils can alternatively be added and heated at this time as well.

At 1606, heated (distilled) water (e.g., 100 grams (about 50% w/w) (at or about 60 seconds, microwaved) can be added by pouring slowly into the heated wax mixture.

At 1608, the heated water and heated wax mixture can then be emulsified using a blender (e.g., immersion) for one or more durations of thirty seconds to achieve the thickness (or consistency). At 1610, aloe vera components and the essential oils can be added to the emulsified mixture. For example, aloe vera juice (e.g., about 20 grams or about 10% w/w), aloe vera flesh (e.g., about 20 grams or about 10% w/w), aloe vera gel (e.g., about 20 grams or about 10% w/w), and about 2.5 grams (or 1.25% w/w) of essentials oils: the essential oils comprising at least one of rosewood, lemongrass, bergamot, or rose.

At 1612, the emulsified mixture, the aloe vera components, the essential oils, the THC extract, the CBD oil, and terpenes can be mixed to produce the lotion formulation, with CBD extract (e.g., about 5 mgs or about 0.0025% w/w), THC extract (e.g., about 5 mgs or about 0.0025% w/w), and terpenes (e.g., about 5 mgs or about 0.0025% w/w).

In other words, this recipe for a two-hundred (200) gram batch, can be scaled up or down, as desired, and can be described another way. Begin by adding: 5 grams of olive oil, 5 grams of almond oil, and 5 grams of grapeseed oil; add from about 2 to about 4 percent of preservative (e.g., natural preservative such as Leucidal Liquid SF from Active Micro Technologies); add 5 grams of vitamin E, and 10 grams of emulsifying wax.

Next, melt the oils, vitamin, preservative, and wax (separately or in combination) gently using a heating source, such as a microwave oven for two (2) minutes (or below 145 degrees) to maintain the effectiveness of the preservative.

Next: warm 100 grams distilled water-microwaved for about one (1) minute. Then, slowly pour the heated water (of about 50% w/w) into the oil mixture. Then, emulsify the mixture with a blender (e.g., immersion) at thirty (30) second intervals, until attaining the desired thickness (or viscosity).

Next, add 20 grams of aloe vera juice, 20 grams of aloe vera flesh, 20 grams of aloe vera gel, and 2.5 grams of essential oils (e.g., at least one of rosewood, lemongrass, bergamot, or rose), and mix thoroughly with 5 mgs of THC extract (e.g., *Indica* and *Sativa* blend), 5 mgs of CBD Extract, and, 5 mgs of terpenes.

Then shake and mix the above formulation, and once mixed sufficiently well, input the final formulation to a product container.

Recipe for Alternative Lotion

Figure 17:
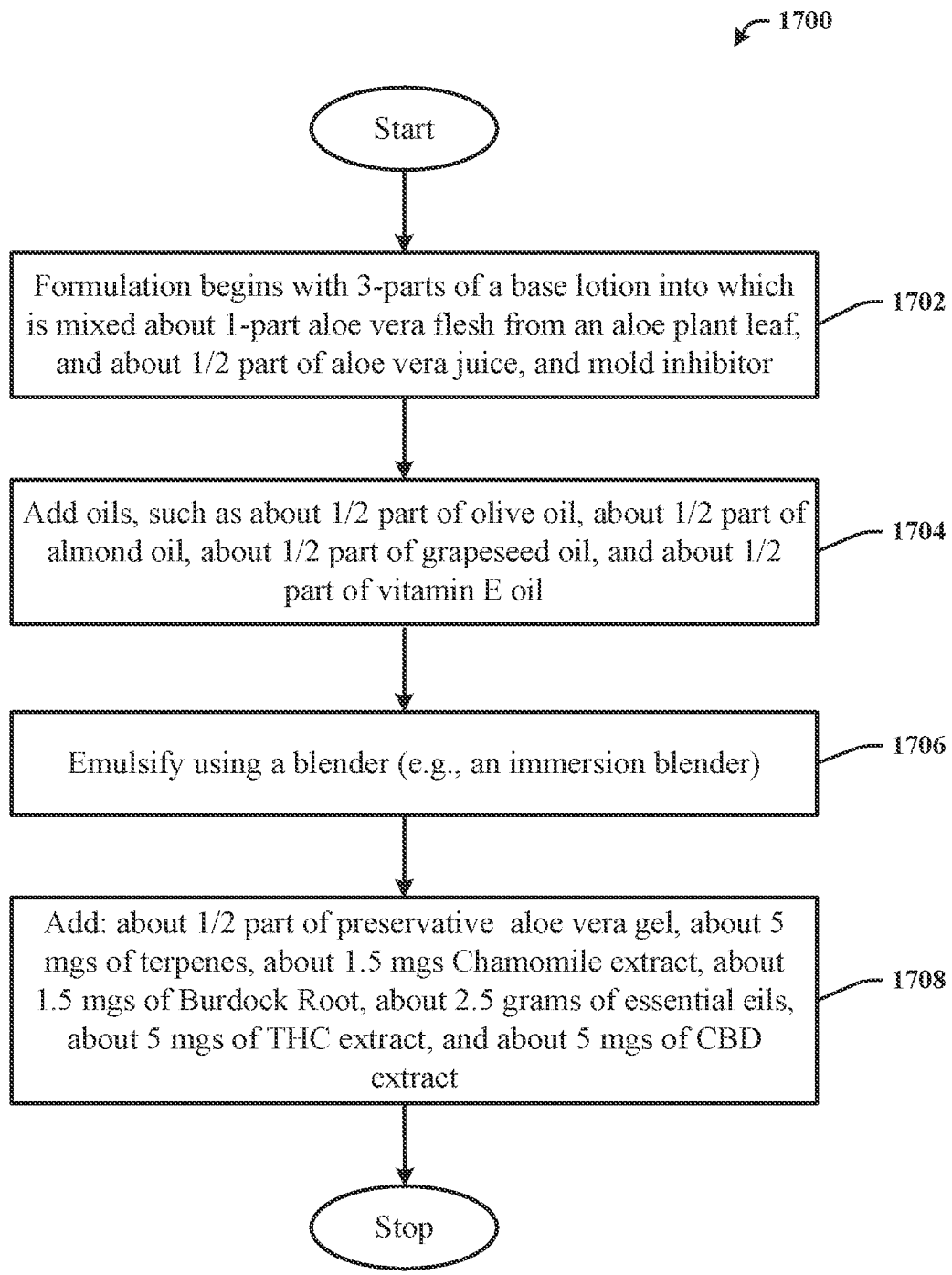
FIG. 17 illustrates a method of making an alternative lotion formulation in accordance with a disclosed process.

FIG. 17 illustrates a method 1700 of making an alternative (handmade) lotion formulation in accordance with a disclosed process. This recipe is for thirty-two (32) ounces having eight (8) parts total. This recipe can be scaled-up for larger quantities, or scaled-down for smaller quantities, as desired.

At 1702, the formulation can begin with providing 3-parts of a base lotion into which is mixed about 1-part aloe vera flesh from an aloe plant leaf, and about ½ part of aloe vera juice and mold inhibitor (e.g., by Lily of The Desert). At 1704, oils can be added, such as about ½ part of olive oil, about ½ part of almond oil, about ½ part of grapeseed oil, and about ½ part of vitamin E oil.

At 1706, the above mix can be emulsified using a blender (e.g., an immersion blender). (An immersion blender is a handheld self-powered tool with blender blades mounted on one end, which blade-end is inserted into the container of liquid to be rotated and processed.)

At 1708, add the following: about ½ part of aloe vera gel, used as preservative (e.g., a Fruit of The Earth brand), about 5 mgs (milligrams) of terpenes, about 1.5 mgs Chamomile extract, about 1.5 mgs of Burdock Root, about 2.5 grams of Essential Oils (e.g., Rosewood, Lemongrass, Bergamot, and Rose), about 5 mgs of THC extract (e.g., *Indica* and *Sativa* Blend), and about 5 mgs of CBD extract.

The prior partial formulations are then shaken and mixed well to create the final formulation.

In other words, this recipe can be scaled up or down, as desired, and be described in another way. Begin with about 3 parts of lotion base (e.g., brand Bon Vitale). Then mix in about 1 part of aloe vera flesh from aloe plant leaf, about ½ part of aloe vera juice, mold inhibitor (e.g., brand Lily of The Desert). Then add: about ½ part of olive oil, about ½ part of almond oil, about ½ part of grapeseed oil, and about ½ part of vitamin E oil. Then emulsify the above partial formulation with a blender (e.g., immersion).

Once emulsified, then add: about ½ part of Aloe Vera Gel (e.g., brand Fruit of The Earth, used as a preservative and mold inhibitor), about 5 mgs of Terpenes, about 1.5 mgs of Chamomile Extract, about 1.5 mgs of Burdock Root, about 2.5 grams of Essential Oils (e.g., Rosewood, Lemongrass, Bergamot, Rose), about 5 mgs of THC Extract (e.g., *Indica, Sativa* or blend thereof), and about 5 mgs of CBD Extract (or oil). Finally, shake and the mix formulation well, and input in a lotion container.

Exfoliation Bar Soap Product—Sea Moss and Irish Moss

This soap product will, along with cleansing the superficial layer of skin, when the sea moss and Irish moss is used, exfoliate the skin layers and replenish vitamins and minerals lost through poor, empty diets of food deficiencies.

When sea moss is ingested, it has a host of immune supporting antioxidant compounds that only the sea can contribute. When used with the help of other botanicals, the spirit-lifting effects can enhance the cleansing effects of sea water. For example, when sea moss is mixed with Lavender or Lemongrass, the effects will be calming or relaxing When Irish moss is combined with Sandalwood or *Eucalyptus*, for example, the soap includes stimulating affects.

This soap can also be produced with the healing properties of Epsom Salt and Himalayan Sea Salt (which both have magnesium) which imparts a grounding and centering effect to the user. When, alternatively or additionally, blending in sandalwood and/or *eucalyptus*, the soap will also have stimulating effects. The fragrance and eye appeal of these specimens are such that consumers may hesitate to use them, but instead, use them as bathroom and shower decorations.

The medicinal, nutritional, and healing benefits of these soaps are appealing. Consider a bar of soap with the sea moss protruding or breaking the surface of the soap product, ready for a mild exfoliation of dead superficial layers of skin, and thereby ready for polishing. A more transparent or clear soap bar, which can contain grassy swirls of the sea moss which are partly or entirely visible, and enhanced by other botanicals resembling jewels encased in an underwater sea world, present an appealing enticement to the consumer not only simply for presentation, but also of application.

Aloe Vera Soap Product-Cold Process

Figure 18:
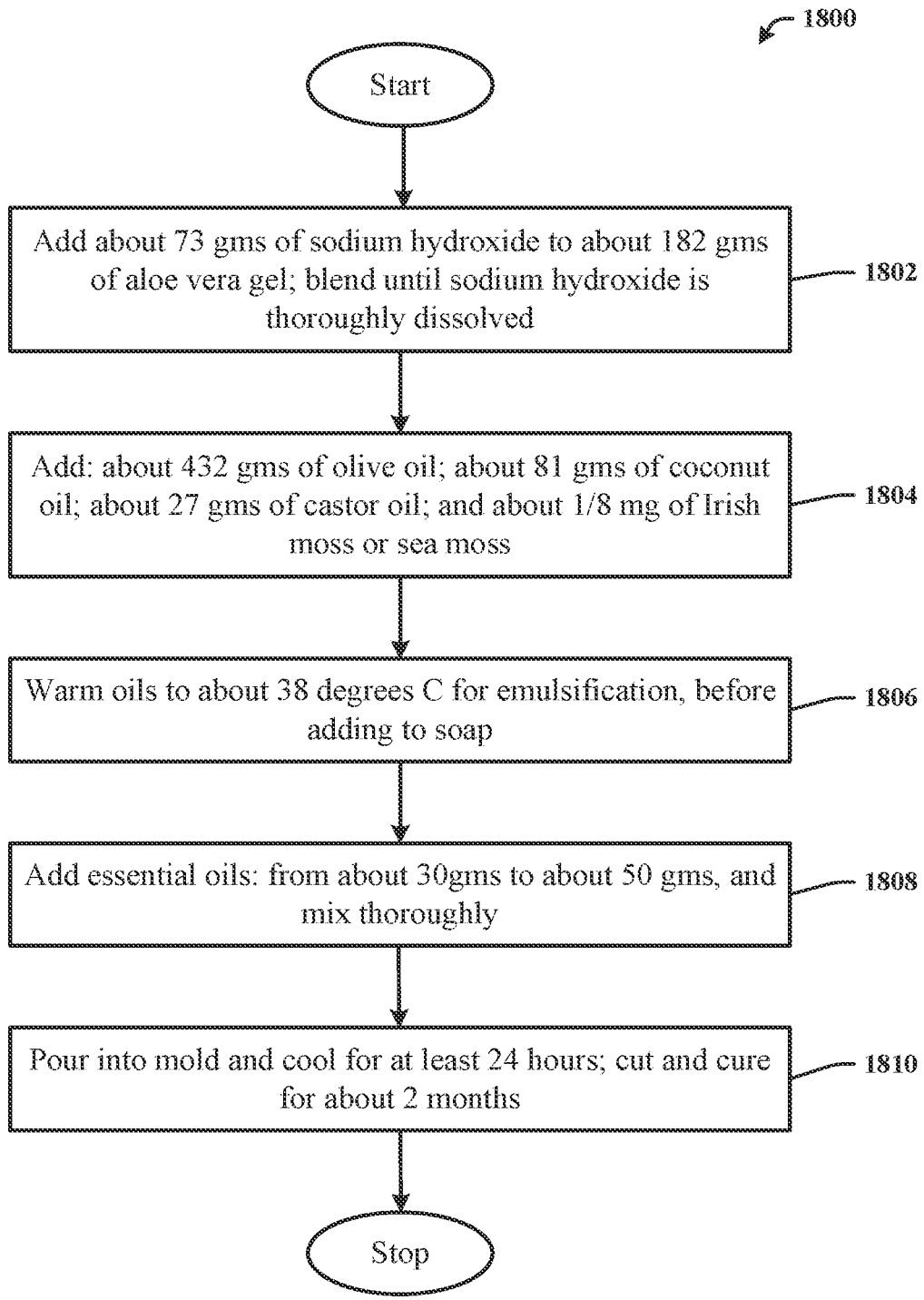
FIG. 18 illustrates a method illustrates a cold process soap formulation method for making a soap in accordance with a disclosed process.

FIG. 18 illustrates a cold process soap formulation method 1800 for making a soap in accordance with a disclosed process. At 1802, about 73 gms of sodium hydroxide is added to about 182 gms of Aloe Vera gel, and blended until the sodium hydroxide is thoroughly dissolved. At 1804, add about 432 gms of olive oil; about 81 gms of coconut oil; about 27 gms of castor oil; and about ⅛ mg of Irish moss or sea moss. At 1806, warm the oils to about 38 degrees C. (or about 100 degrees F.) to emulsify, before adding to soap. At 1808, add essential oils: about 30 gms to about 50 gms, and mix thoroughly. At 1810, pour into a mold and cool for at least 24 hours. Then cut and cure for about two months.

Put another way, a cold process formulation for an aloe vera soap product can be as follows. This cold-process recipe and can be scaled up or down, as desired, for a corresponding, more or less, amount of soap product. Add 73 gms of sodium hydroxide to 182 gms of Aloe Vera gel; blend until sodium hydroxide is thoroughly dissolved; then add: 432 gms of olive oil, 81 gms of coconut oil, 27 gms of castor oil, and ⅛ mg of Irish moss or sea moss.

Next, warm oils (olive, coconut, and castor) to 38 degrees C. (or 100 degrees F.) to emulsify, before adding to soap; blend lye solution and oils, with a lye solution at about 22 degrees C. (70 degrees F.); add essential oils: 30 gms to 50 gms, and mix thoroughly; pour into mold and cool for at least 24 hours; and, cut and cure for about 2 months.

A batch of 1,000 grams (1 kg) produces 13 to 14 bars of soap at about 100 grams each (lye concentration can be 33%; water is 67%, and superfat at 3% for the 100% lye/water mixture). Superfat is defined as excess fat remaining in soap after a saponification process is completed. Saponification involves the conversion of fat, oil, or lipid into soap and alcohol by the action of aqueous alkali. Note that the sea moss and/or Irish moss can be added prior to the warming process.

Exfoliation Bar Soap Product—Sea Moss and Irish Moss—Melt and Pour

The melt-and-pour process for the Irish moss and sea moss exfoliation bar has a similar process, using the prepared base products from another vendor, (e.g., brand Our Earth Secrets, found at ourearths.com) and related fillings (also, fillers).

Figure 19:
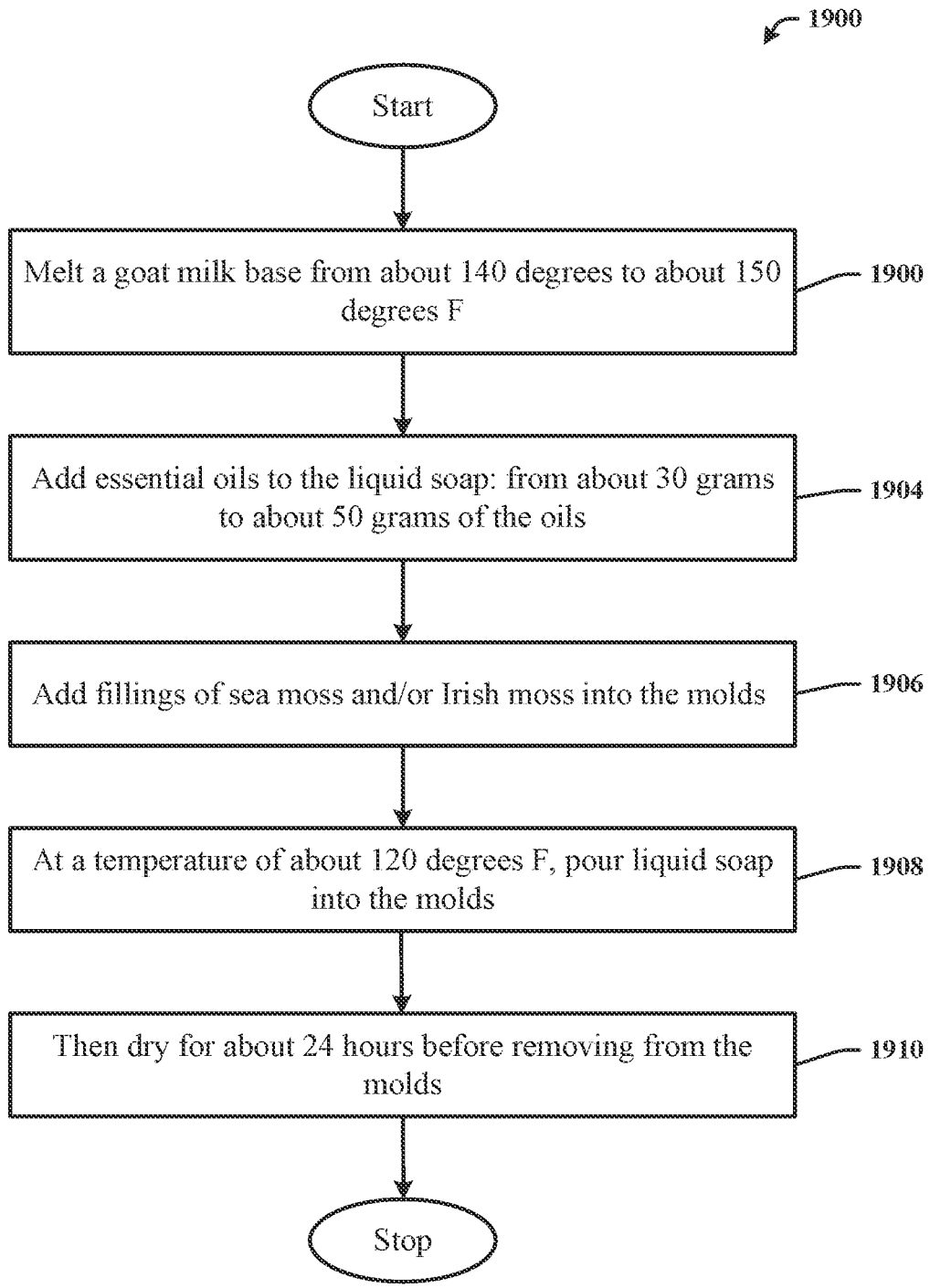
FIG. 19 illustrates a method illustrates a soap formulation method for making an exfoliation soap in accordance with a disclosed process.

FIG. 19 illustrates a soap formulation method 1900 for making an exfoliation soap in accordance with a disclosed process. At 1902, melt a goat milk base (e.g., brand Our Earth Secrets) from about 140 degrees to about 150 degrees F. At 1904, add essential oils to the liquid soap: from about 3% to about 5%, which approximates about 30 grams to about 50 grams of the oils. At 1906, add fillings of sea moss and/or Irish moss into the molds. At 1908, at a temperature of about 120 degrees F., pour liquid soap into the molds. At 1910, dry for about 24 hours before removing from the molds.

Put another way, the melt-and-pour formulation process comprises, melting a goat milk base (e.g., by Our Earth Secrets) from 140 degrees to 150 degrees F. (As indicated, melt-and-pour ingredients can be purchased at different vendors.), adding essential oils to the liquid soap (e.g., from 3% to 5%, which approximates 30 grams to 50 grams of the oils), adding fillings of sea moss and/or Irish moss into the molds, followed by, at a temperature of about 120 degrees F., pour liquid soap into the molds, and, then dry for about 24 hours before removing from the molds.

Exfoliation Bar Soap "Original" Product—Sea Moss and Irish Moss Only—Melt and Pour The "original" (or "version 1") exfoliation bar soap includes the Irish moss and sea moss. A *cannabis* filling (of particulates such as stems, leaves, etc.) is contained on the surface and throughout the middle of the bar. The moss bar can be employed in different bases such as aloe vera and goat milk. The *cannabis* can be decarboxylated, which activates and infuses the Irish moss into the soap. Decarboxylation releases the terpenes for the aroma and the ultimate feel of relaxation.

Figure 20:
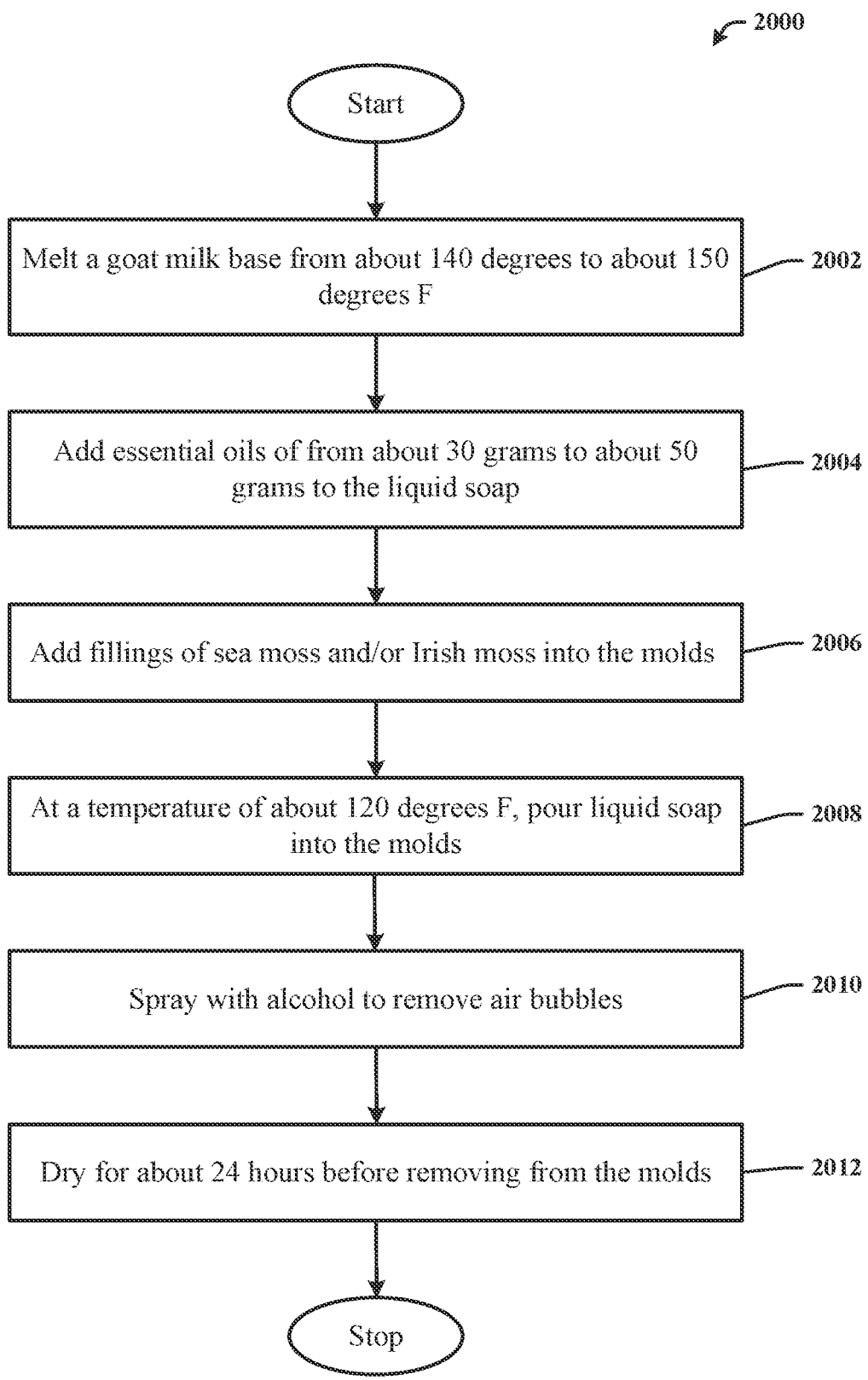
FIG. 20 illustrates an alternative soap formulation method for making an exfoliation soap in accordance with a disclosed process.

FIG. 20 illustrates an alternative soap formulation method 2000 for making an exfoliation soap in accordance with a disclosed process. At 2002, melt an aloe vera base (e.g., by Our Earth Secrets) from about 140 degrees to about 150 degrees F. At 2004, add essential oils of from about 30 grams to about 50 grams (from about 3% w/w to about 5% w/w). At 2006, add fillings of sea moss and/or Irish moss into the molds, equaling ⅛th ounce per bar for individual bar molds. At 2008, at a temperature of about 120 degrees F., pour liquid soap into the molds. At 2010, then spray with alcohol to remove air bubbles. At 2012, then dry for about 24 hours before removing from the molds.

Put another way, the meld-and-pour formulation process can comprise, melting an aloe vera base (e.g., by Our Earth Secrets) from about 140 degrees to about 150 degrees F. (As indicated, melt-and-pour ingredients can be purchased at different vendors.) Add essential oils to the liquid soap: from about 3% to about 5%, which approximates 30 grams to 50 grams of the oils. Add fillings of sea moss and/or Irish moss into the molds, equaling ⅛th ounce per bar for individual bar molds. At a temperature of about 120 degrees F., pour liquid soap into the molds. Spray the liquid soap with alcohol to remove air bubbles. Then dry for about 24 hours before removing from the molds.

Exfoliation Bar Soap Product—Sea Moss and Irish Moss Only—Cold Process

Figure 21:
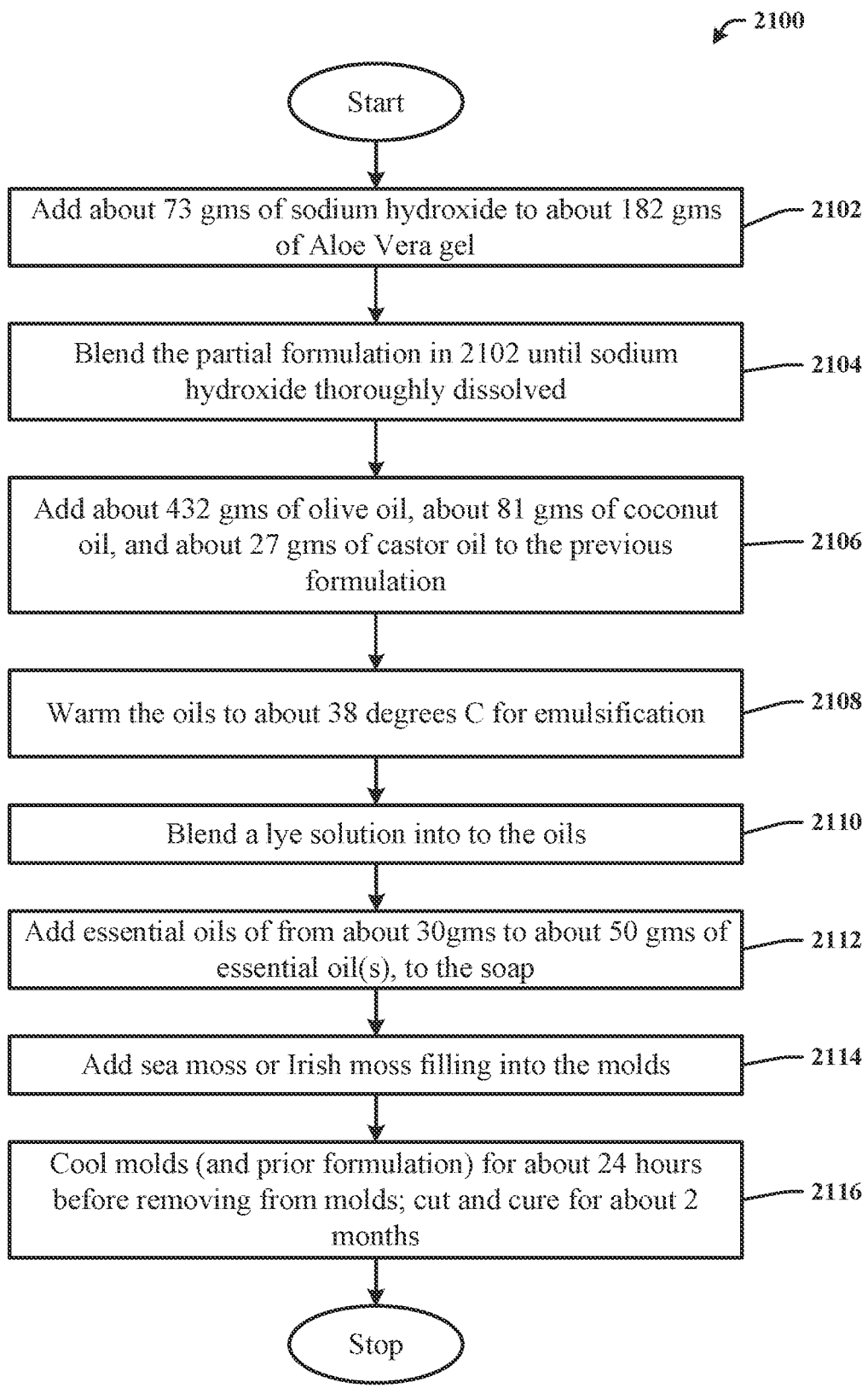
FIG. 21 illustrates a cold-process soap formulation method for making an alternative exfoliation soap in accordance with a disclosed process.

FIG. 21 illustrates a cold-process soap formulation method 2100 for making an alternative exfoliation soap in accordance with a disclosed process. At 2102, add about 73 gms of sodium hydroxide to about 182 gms of Aloe Vera gel. At 2104, blend the partial formulation in 2102 until the sodium hydroxide is dissolved. At 2106, add about 432 gms of olive oil, about 81 gms of coconut oil, and about 27 gms of castor oil to the previous formulation. At 2108, warm the oils to about 38 degrees C. (or about 100 degrees F.) for emulsification. At 2110, blend a lye solution into to the oils. (The lye solution can be at about 22 degrees C. (70 degrees F.) before adding oils to the soap.) At 2112, add essential oils to liquid soap: from about 30 gms to about 50 gms of essential oil(s). At 2114, add sea moss or Irish moss filling into the molds. At 2116, cool the molds (and formulation) for about 24 hours before removing from molds. Then cut and cure for about 2 months.

Put another way, begin by adding 73 gms of sodium hydroxide to 182 gms of Aloe Vera gel. Blend the gel and sodium hydroxide until the sodium hydroxide is thoroughly dissolved. Then, add 432 gms of olive oil, 81 gms of coconut oil, and 27 gms of castor oil. Warm the oils to about 38 degrees C. (100 degrees F.) for emulsification. Blend the lye solution and oils before adding oils to soap. (The lye solution can be at about 22 degrees C.). Then add the essential oils to the liquid soap (e.g., 30 gms to 50 gms of essential oil(s)). Then add sea moss or Irish moss filling into the molds. Cool for at least 24 hours before removing from molds, and thereafter, cut and cure for about 2 months (Note that the sea moss and/or Irish moss can be added at the time the preparation is being poured into the molds.)

Exfoliation Bar Soap—Marijuana

This soap product will, along with cleansing the superficial layer of skin and when the real marijuana is used, exfoliate the superficial layers of skin and have calming effects. When marijuana is used with the help of other botanicals the spirit lifting effects can enhance the cleansing effects of the user. For example, when *Indica* is mixed with Lavender or Lemongrass the effects will be calming or relaxing. When *Sativa* is combined with Sandalwood or *Eucalyptus* the soap can have stimulating effects.

The soap also includes, when mixed with marijuana, the healing properties of Epsom Salt and Himalayan Sea Salt which has magnesium and is grounding and centering. The aroma and presentation aspects of this soap alone, provide an enticement to purchase this product. For example, a flower-shaped soap with marijuana petals or white goat milk with floating marijuana and botanicals present an appeal for purchasing the soap product.

Figure 22:
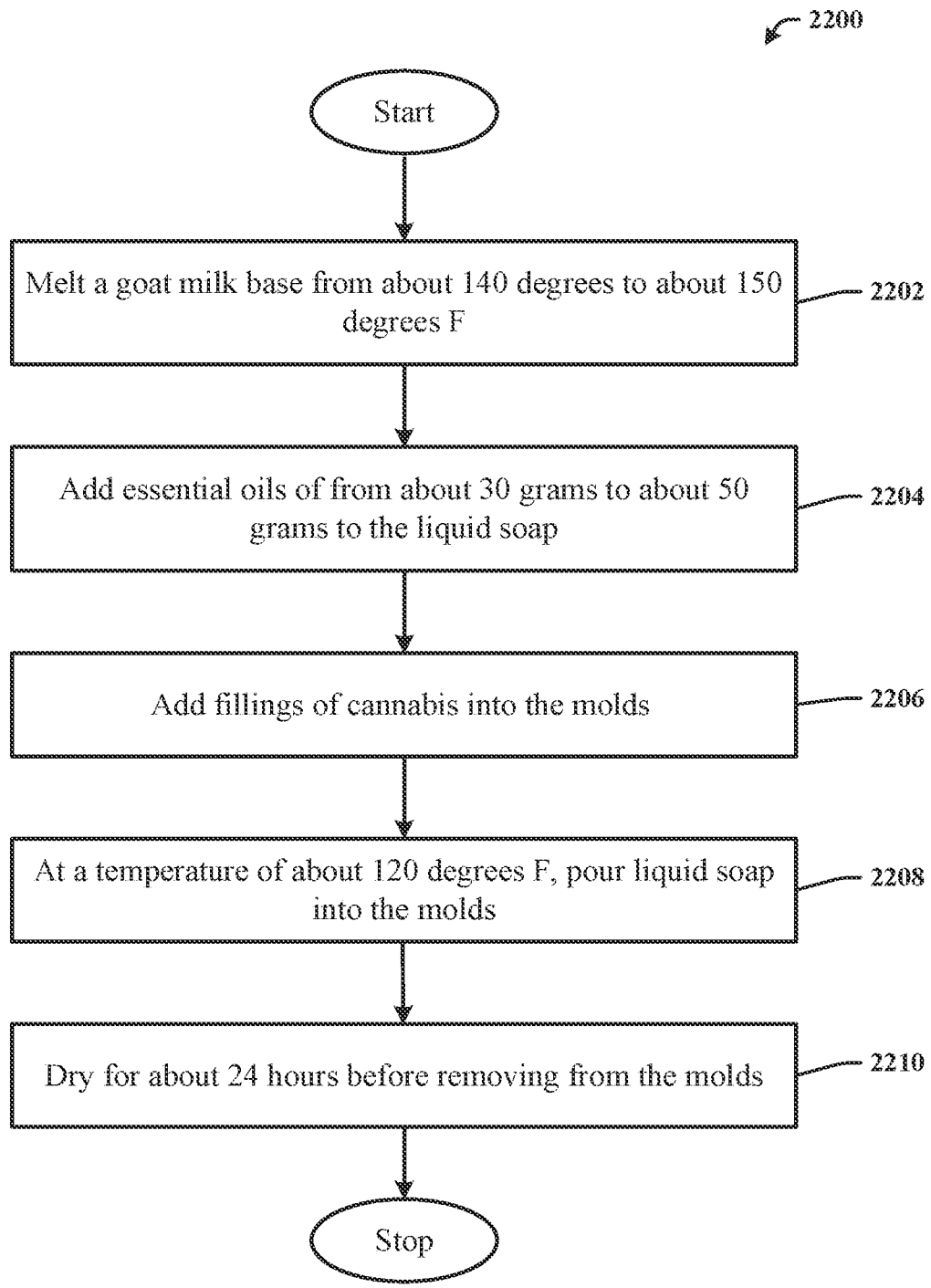
FIG. 22 illustrates a melt-and-pour exfoliation soap formulation method for making an alternative marijuana-based exfoliation soap in accordance with a disclosed process.

FIG. 22 illustrates a melt-and-pour exfoliation soap formulation method 2200 for making an alternative marijuana-based exfoliation soap in accordance with a disclosed process. The melt-and-pour process is similar to using a prepared bar-base product, such as by Our Earth Secrets (e.g., found at ourearths.com) and related fillings.

At 2202, melt a goat-milk-base (e.g., brand Our Earth Secrets) from about 140 degrees to about 150 degrees F. As indicated, melt-and-pour ingredients can be purchased at different vendors. At 2204, add essential oils of from about 30 grams to about 50 grams (from about 3% w/w to about 5% w/w) to the liquid soap. At 2206, add fillings of *cannabis* into the molds. At 2208, at a temperature of about 120 degrees F., pour the liquid soap into the molds. At 2210, dry the complete formulation in the molds for about 24 hours, before removing from the bars from the molds.

Put another way, the melt-and-pour formulation process for a marijuana-based exfoliation bar can be the following. Melt a goat-milk-base (e.g., by Our Earth Secrets) from about 140 degrees to about 150 degrees F. (Melt-and-pour ingredients can be purchased at different vendors.) Add essential oils to the liquid soap: from about 3% to about 5% of the volume, which approximates 30 grams to 50 grams of the essential oils. Fillings of *cannabis* can then be added into the molds (with or without sea moss or Irish moss). At a temperature of about 120 degrees F., the liquid soap can be poured into the molds. The final formulation and the mold can then be dried for about 24 hours before removing the bars from the molds.

Exfoliation Bar Soap—Original—Marijuana Only—Melt and Pour Process

The above "original" exfoliation bar formulation uses marijuana (e.g., THC extract such as *Sativa* and/or *Indica*) as exfoliant(s). The *cannabis* filling can be distributed from the surface and throughout middle of the bar. The *cannabis* bar can be produced with different bases such as aloe vera and goat's milk. The *cannabis* can be decarboxylated, which activates and infuses the cannabinoids into the soap. This releases the terpenes for the aroma and the ultimate feel of relaxation.

Figure 23:
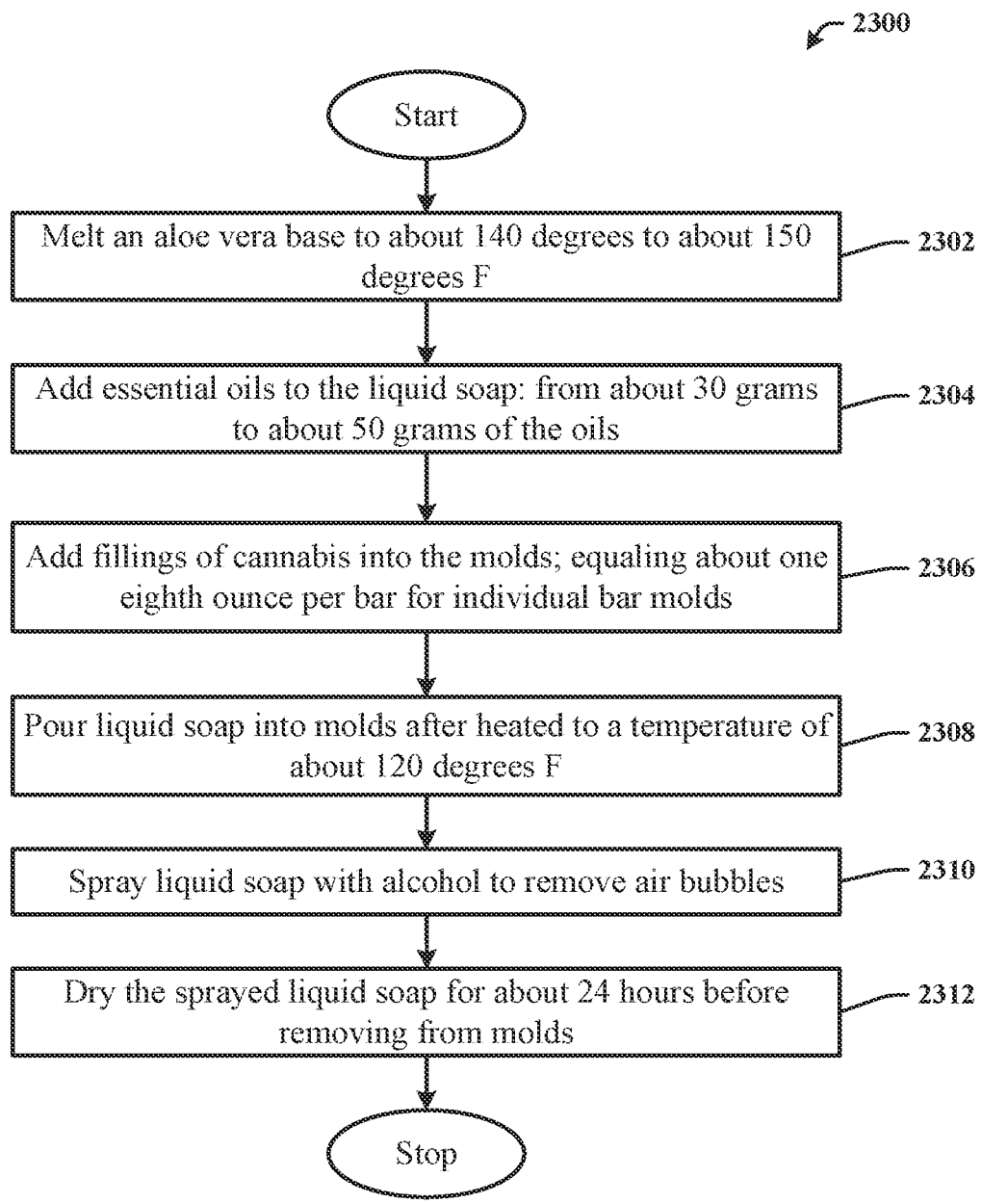
FIG. 23 illustrates a soap formulation method for making an alternative exfoliation soap in accordance with a disclosed process.

FIG. 23 illustrates a soap formulation method 2300 for making an alternative exfoliation soap in accordance with a disclosed process. At 2302, an aloe vera base (e.g., by Our Earth Secrets) can be melted to about 140 degrees to 150 degrees F. (As indicated, melt-and-pour ingredients can be purchased at different vendors.)

At 2304, essential oils are added to the liquid soap: from about 3% to about 5% (which approximates about 30 grams to about 50 grams of the oils, respectively). At 2306, fillings of *cannabis* are added into the molds; equaling ⅛th ounce per bar for individual bar molds. At 2308, at a temperature of about 120 degrees F., the liquid soap can be poured into the molds. At 2310, the liquid soap is sprayed with alcohol to remove air bubbles. At 2312, the sprayed liquid soap is allowed to dry for about 24 hours before removing from the molds.

Exfoliation Marijuana Bar—Cold Process

Figure 24:
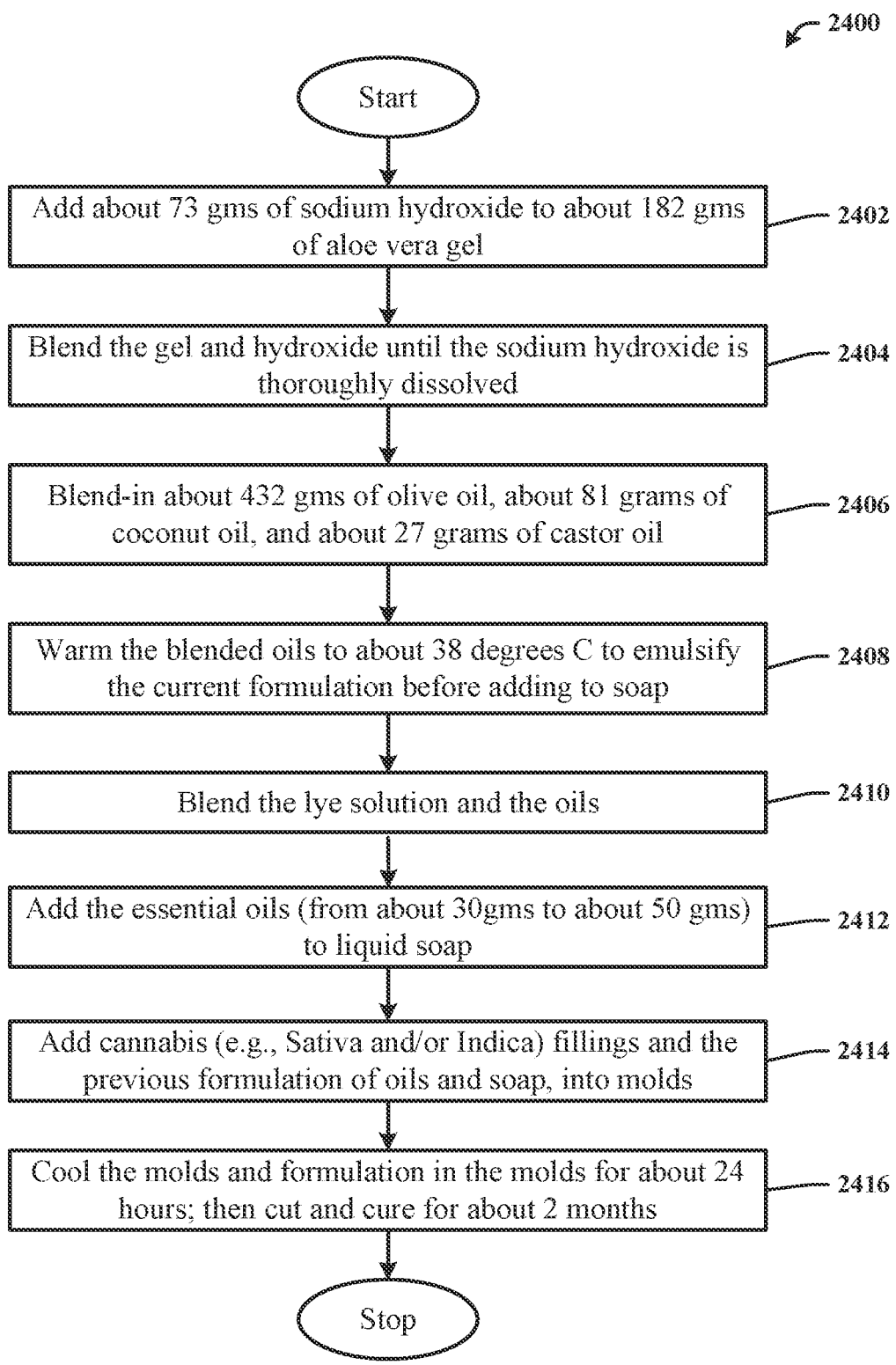
FIG. 24 illustrates a soap formulation method for making an alternative process exfoliation marijuana soap in accordance with a disclosed process.

FIG. 24 illustrates a soap formulation method 2400 for making an alternative process exfoliation marijuana soap in accordance with a disclosed process. At 2402, add about 73 gms of sodium hydroxide to about 182 gms of Aloe Vera gel. At 2404, blend the gel and hydroxide until the sodium hydroxide is thoroughly dissolved. At 2406, blend-in about 432 gms of olive oil, about 81 grams of coconut oil, and about 27 grams of castor oil. At 2408, warm the blended oils to about 38 degrees C. (or about 100 degrees F.) to emulsify the current formulation before adding to soap.

At 2410, blend the lye solution and the oils. (The lye solution can be at a temperature of about 22 degrees C. (70 degrees F.) with a lye concentration of about 33%, water at about 67%, and superfat at about 3%.) At 2412, add the essential oils (from about 30 gms to about 50 gms) to liquid soap. At 2414, add *cannabis* (e.g., *Sativa* and/or *Indica*) fillings and the previous formulation of oils and soap, into molds. At 2416, cool the molds and formulation in the molds for about 24 hours; then cut and cure for about 2 months. A batch of 1,000 grams (1 kg) produces from about 13 to about 14 bars of soap at about 100 grams each.

Marijuana Herbal Teas and Moods

The disclosed combination of teas is intended to heal and build a strong immunity and to heighten a peaceful sensation. The herbal tea experience can be a *cannabis* plus CBD oil tea, a non-*cannabis* and CBD oil tea, a straight tea, an enhanced tea with *cannabis* buds for THC and *cannabis* CBD, and/or enhanced tea with *cannabis* buds for THC and non-*cannabis* CBD, for example. This tea can be provided in different flavors (e.g., three) and moods. The first mood produced is a Relax flavor in which the *Indica* marijuana strain soothes and calms with herbs and botanicals such as Chamomile, Lemongrass, and Passion Flowers.

The second mood produced is the Lift flavor for stimulation. This tea can be fused with *cannabis* such as the *Sativa* strain, which is intended to activate and stimulate the senses with added herbs such as Hibiscus, Ginger and Cinnamon. The third mood of the herbal tea flavor produced is the Cleanse effect. This purification tea is provided by using the combination of *Sativa* and *Indica* strains of marijuana, along with the herbs of Rosemary, Lemon, and Sage. (All teas used can be produced within the Federal Guidelines Regulatory limit of THC.)

Marijuana Bath Salts and Bath Bombs

The effervescence of Dead Sea salts, rose buds, lavender buds, *cannabis* buds and chamomile flowers provide a positive experience for the user. Botanicals meant to decompress the nervous system using nature's own terpenoids to calm and soothe a savage soul. Marijuana infused in a decarboxylator (a machine that performs decarboxylation) activates terpenes when used in a bath releasing the magic aroma of the *cannabis*. (Decarboxylation is the process of activating the effects of a specific component. For example, decarboxylation is the process of heating *cannabis* to a specific temperature and for a specific length of time, which process activates the psychoactive effects of the THC as well as activating other cannabinoids inside.) Thus, decarboxylating marijuana produces the noticeable effects of *cannabis* for medical and recreational users.

The marijuana not infused still has calming effects, just as the visual effects of rose petals, chamomile flowers and lavender would. Added are Aloe Vera and vitamin E to moisturize within the soak. The loose Epsom salts and Dead Sea salts that come in the decorative jar add needed magnesium for a healthy glow. This combination of botanicals is just as effective in the prepared Bath Bombs. A bath bomb releases all its ingredients in a fizzy, aromatic discharge technique ("bomb"), thereby optimizing the effect of marijuana buds. The effervescence of the bath bomb brings the aromatherapeutic experience, and medicinal experiences pleasantly together. The minerals and the marijuana gently and effectively remove the toxic nature of the free radicals.

What has been described above includes examples of the disclosed products and methods. It is, of course, not possible to describe every conceivable combination of products and methods, but one of ordinary skill in the art may recognize that many further combinations and permutations are possible. Accordingly, the novel products and methods are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of making a lotion formulation, comprising:
   receiving olive oil, almond oil, grapeseed oil, a natural preservative, a vitamin, wax, aloe vera components, essential oils, tetrahydrocannabinol (THC) extract, terpenes for a specific effect, and cannabidiol (CBD) oil;
   melting the olive oil, the almond oil, the grapeseed oil, the vitamin, the natural preservative, and the wax, at a temperature which retains effectiveness of the natural preservative, to create a heated wax mixture;
   adding heated water to the heated wax mixture;
   emulsifying the heated water and heated wax mixture into an emulsified mixture;
   adding the aloe vera components and the essential oils to the emulsified mixture; and
   mixing the emulsified mixture, the aloe vera components, the essential oils, the THC extract, the CBD oil, and the terpenes to produce the lotion formulation.

2. The method of claim 1, wherein the olive oil is about 2.5% w/w, the almond oil is about 2.5% w/w, the grapeseed oil is about 2.5% w/w, the vitamin is vitamin E of about 2.5% w/w, and the wax, which is an emulsifying wax, at about 5.0% w/w.

3. The method of claim 2, wherein the THC extract is obtained from *Cannabis* species of at least one of *Cannabis indica* or *Cannabis sativa*, the THC extract at about 0.0025% w/w.

4. The method of claim 1, wherein the CBD oil is about 0.0025% w/w.

5. The method of claim 1, wherein the terpenes are at about 0.0025% w/w.

6. The method of claim 1, wherein the natural preservative is about 2% w/w to about 4% w/w.

7. The method of claim 1, wherein the essential oils comprise about 1.25% w/w of at least one of rosewood, lemongrass, bergamot, or rose.

8. A method of making a lotion formulation, comprising:
receiving olive oil, almond oil, grapeseed oil, a natural preservative, a vitamin, wax, aloe vera components, essential oils, THC extract, terpenes for a specific effect, and cannabidiol (CBD) oil;
melting the olive oil, the almond oil, the grapeseed oil, the vitamin, the natural preservative, and the wax, at a temperature which retains effectiveness of the natural preservative, to create a heated wax mixture;
adding heated water to the heated wax mixture;
emulsifying the heated water and heated wax mixture into an emulsified mixture;
adding the aloe vera components and the essential oils to the emulsified mixture; and
mixing the emulsified mixture, the aloe vera components, the essential oils, the THC extract, the CBD oil, and the terpenes to produce the lotion formulation, wherein the CBD oil is about 0.0025% w/w, the THC extract is of at least one of *Cannabis indica* or *Cannabis sativa* and at about 0.0025% w/w, and the terpenes at about 0.0025% w/w.

\* \* \* \* \*